US010467891B1

(12) United States Patent
Bart et al.

(10) Patent No.: US 10,467,891 B1
(45) Date of Patent: Nov. 5, 2019

(54) METHOD FOR ALLOWING DRONE ACTIVITY TO MODIFY EVENT DETECTION BY A MONITORING SYSTEM

(71) Applicant: Alarm.com Incorporated, Tysons, VA (US)

(72) Inventors: Gary Franklin Bart, Weston, FL (US); Dean Constantine, Ft. Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/976,648

(22) Filed: May 10, 2018

Related U.S. Application Data

(60) Provisional application No. 62/504,167, filed on May 10, 2017.

(51) Int. Cl.
| | | |
|---|---|---|
| *G08B 1/08* | (2006.01) | |
| *G08B 29/18* | (2006.01) | |
| *B64C 39/02* | (2006.01) | |
| *G08B 13/04* | (2006.01) | |
| *G08B 26/00* | (2006.01) | |

(52) U.S. Cl.
CPC .......... *G08B 29/188* (2013.01); *B64C 39/024* (2013.01); *G08B 13/04* (2013.01); *G08B 26/007* (2013.01); *B64C 2201/127* (2013.01)

(58) Field of Classification Search
CPC .. G08B 5/001; G08B 19/00; G08B 13/19645; G05D 1/0088; G08G 5/0073
See application file for complete search history.

(56) References Cited

U.S. PATENT DOCUMENTS

| | | | |
|---|---|---|---|
| 2015/0339912 A1* | 11/2015 | Farrand | G08B 25/001 340/501 |
| 2017/0092109 A1* | 3/2017 | Trundle | B60L 11/1824 |
| 2017/0187993 A1* | 6/2017 | Martch | B64C 39/024 |

* cited by examiner

*Primary Examiner* — Hongmin Fan
(74) *Attorney, Agent, or Firm* — Fish & Richardson P.C.

(57) ABSTRACT

Methods, systems, and apparatus, including computer programs encoded on a storage device, for enabling drone activity in a property monitored by a property monitoring system without triggering a false alarm. In one aspect, the method includes actions of obtaining a location of the drone, identifying a first sensor installed at the property that is within a predetermined distance of the drone, detecting first sensor data generated by the first sensor that is within a predetermined distance of the drone, wherein the first sensor data includes data that is indicative of an event, determining whether a second sensor that is mounted to the drone is generating second sensor data that corroborates the event indicated by the first sensor data, and disregarding, by the property monitoring system, the first sensor data in determining whether to trigger an alarm.

20 Claims, 6 Drawing Sheets

METHOD FOR ALLOWING DRONE ACTIVITY TO MODIFY EVENT DETECTION BY A MONITORING SYSTEM

CROSS-REFERENCE TO RELATED APPLICATIONS

This application claims the benefit of the U.S. Provisional Patent Application No. 62/504,167 filed May 10, 2017 and entitled "Method For Allowing Drone Activity To Modify Event Detection By a Monitoring System," which is incorporated herein by reference in its entirety.

BACKGROUND

A drone may be programmed to perform surveillance operations for a property. Surveillance operations may include autonomously navigating inside the property, outside the property, or both, and using one or more drone-mounted sensors to collect information about the property. The drone-mounted sensors may include sensors that capture video data, sensors that capture audio data, sensors that capture movement, sensors that capture temperature data, sensors that capture the presence of gases, or the like.

SUMMARY

Operation of a drone in a property that includes the monitoring system presents a number of challenges. For example, the surveillance devices installed inside the property, outside the property, or both, may detect (i) the presence of the drone as the drone performs routine surveillance operations and (ii) generate sensor data that is indicative of a potential event. The generated sensor data from one or more the surveillance devices based on the presence of the drone may result in the triggering of false alarms. The occurrence of false alarms may result in one or more of the surveillance devices being reset, deactivated, or even replaced. Alternatively, or in addition, such false alarms may also incur costs for the property occupant, property owner, or the like if one or more of the false alarms trigger an official response from a security monitoring service, law enforcement agency, or the like. This is because a security monitoring service, law enforcement agency, or both, may issue a fine to the property occupant, property owner, or the like for responding to such false alarms.

Systems and methods are disclosed that allow for drone activity to modify event detection by a monitoring system. In some implementations, the system and method may modify event detection by the monitoring system in an effort to reduce the occurrence of false alarms triggered by drone operations. The disclosed systems and methods facilitate deactivation of one or more monitoring system sensors for a predetermined period of time in response to the detection of drone activity that is occurring in a portion of the property, in response to a determination that drone activity will soon occur in a portion of the property, or the like. Alternatively, or in addition, the disclosed systems and methods may disregard (e.g., ignore) sensor data generated by one or more sensors in a predetermined vicinity of a drone's current location unless one or more drone-mounted sensors corroborate the sensor data generated by the one or more sensors.

According to one innovative aspect of the present disclosure, a property monitoring system for enabling drone activity in a property monitored by the property monitoring system without triggering a false alarm is disclosed. The property monitoring system may include a monitoring unit that includes one or more processors and one or more computer readable storage media storing instructions that, when executed by the one or more processors, performs operations. In one aspect, the operations may include obtaining, by the monitoring unit, a location of the drone, identifying, by the monitoring unit, a first sensor installed at the property that is within a predetermined distance of the drone, detecting, by the monitoring unit, first sensor data generated by the first sensor that is within a predetermined distance of the drone, wherein the first sensor data includes data that is indicative of an event, determining, by the monitoring unit, whether a second sensor that is mounted to the drone is generating second sensor data that corroborates the event indicated by the first sensor data, and in response to a determination that the second sensor that is mounted to the drone has not generated second sensor data that corroborates the event indicated by the first sensor data, disregarding, by the monitoring unit, the first sensor data in determining whether to trigger an alarm.

Other aspects include corresponding methods, apparatus, and computer programs to perform actions of methods defined by instructions encoded on one or more computer storage devices.

These and other versions may optionally include one or more of the following features. For instance, in some implementations, the operations may further include in response to a determination that the second sensor that is mounted to the drone has generated second sensor data that corroborates the event indicated by the first sensor data, determining, by the monitoring unit, to trigger an alarm based on the event indicated by the first sensor data and the second sensor data.

In some implementations, the operations may include triggering, by the monitoring unit, an alarm based on the determination by the monitoring unit that the second sensor data corroborates the event indicated by the first sensor data.

In some implementations, the operation may further include identifying, by the monitoring unit, a third sensor installed at the property that is not within a predetermined distance of the drone, detecting, by the monitoring unit, third sensor data generated by the third sensor that is not within a predetermined distance of the drone, wherein the third sensor data includes data that is indicative of an event, and determining, by the monitoring unit, to trigger an alarm based on the event indicated by the third sensor data.

In some implementations, obtaining, by the monitoring unit, the location of the drone includes obtaining location information that is broadcast by a communication device that is mounted to the drone.

In some implementations, identifying, by the monitoring unit, a first sensor installed at the property that is within a predetermined distance of the drone may include identifying a first sensor installed at the property that is located within the same room as the drone and the first sensor that is installed at the property includes a motion detector, a glass break sensor, a camera, or a microphone.

In some implementations, the second sensor that is mounted to the drone includes a motion sensor.

In some implementations, detecting, by the monitoring unit, first sensor data generated by the first sensor that is within a predetermined distance of the drone may include detecting, by the monitoring unit, first sensor data generated by a first motion sensor that is within a predetermined distance of the drone, wherein the first sensor data that is generated by the first motion sensor includes data indicative of a moving object, and determining, by the monitoring unit, whether a second sensor that is mounted to the drone is generating second sensor data that corroborates the event indicated by the first sensor data may include determining, by the monitoring unit, whether a second motion sensor that is mounted to the drone has generated data indicative of a moving object that corroborates the detection of a moving object by the first motion sensor.

In some implementations, detecting, by the monitoring unit, first sensor data generated by the first sensor that is within a predetermined distance of the drone may include detecting, by the monitoring unit, first sensor data generated by a first motion sensor that is within a predetermined distance of the drone, wherein the first sensor data that is generated by the first motion sensor includes data indicative of a moving object, and wherein determining, by the monitoring unit, whether a second sensor that is mounted to the drone is generating second sensor data that corroborates the event indicated by the first sensor data may include determining, by the monitoring unit, whether a camera that is mounted to the drone has captured image data that depicts an image of a human object that is present in the property and corroborates the detection of a moving object by the first motion sensor.

In some implementations, detecting, by the monitoring unit, first sensor data generated by the first sensor that is within a predetermined distance of the drone may include detecting, by the monitoring unit, first sensor data generated by a first motion sensor that is within a predetermined distance of the drone, wherein the first sensor data that is generated by the first motion sensor includes data indicative of the presence of a human object and determining, by the monitoring unit, whether a second sensor that is mounted to the drone is generating second sensor data that corroborates the event indicated by the first sensor data may include determining, by the monitoring unit, whether a microphone that is mounted to the drone has captured sound data that is indicative of a moving object in the property and corroborates the detection of the presence of the human object by the first motion sensor.

In some implementations, sound data that is indicative of the presence of the human object in the property may include the sound of a voice, the sound of footsteps, or the sound of breathing.

In some implementations, detecting, by the monitoring unit, first sensor data generated by the first sensor that is within a predetermined distance of the drone may include detecting, by the monitoring unit, first sensor data generated by a first glass break sensor that is within a predetermined distance of the drone, wherein the first sensor data that is generated by the first glass break sensor includes data indicative of a high pitched sound associated with the breaking of glass, and wherein determining, by the monitoring unit, whether a second sensor that is mounted to the drone is generating second sensor data that corroborates the event indicated by the first sensor data may include determining, by the monitoring unit, whether a second glass-break sensor that is mounted to the drone has generated data indicative of a high pitched sound that corroborates the detection of breaking glass by the first glass break sensor.

In some implementations, the monitoring unit is located at a location that is remote from the property.

These, and other innovative aspects, are described in more detail in the corresponding detailed description, drawings, and the claims.

DETAILED DESCRIPTION

Figure 1:
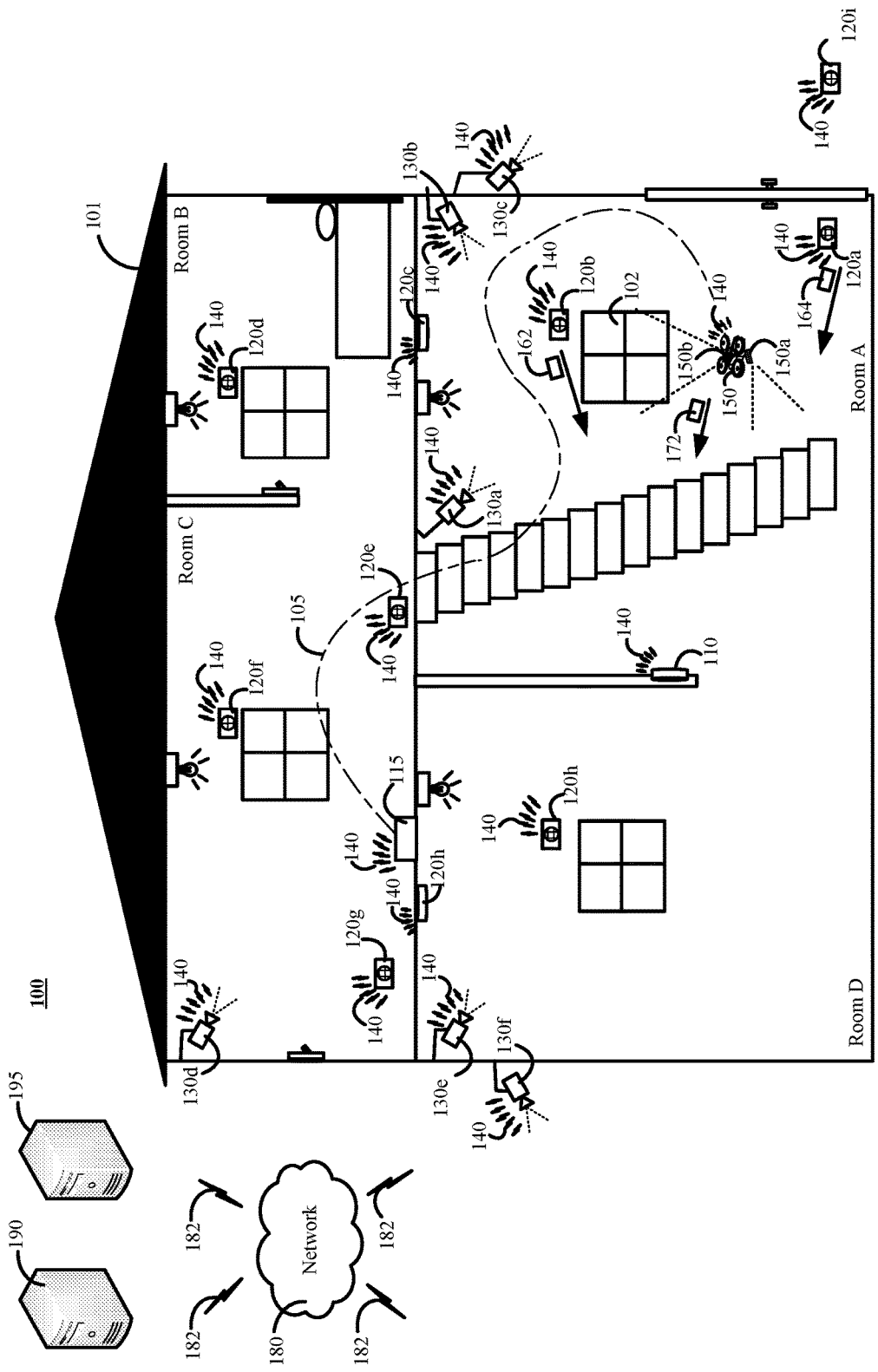
FIG. 1 is a contextual diagram of an example of a system for allowing drone activity to modify event detection by a monitoring system.

FIG. 1 is a contextual diagram of an example of a system for allowing drone 150 activity to modify event detection by a monitoring system 100. The monitoring system 100 may include at least a monitoring system control unit 110, a drone charging station 115, a network 140, a drone 150, and one or more surveillance devices. The one or more surveillance devices may include one or more sensors 120a, 120b, 120c, 120d, 120e, 120f, 120g, 120h, 120i, one or more cameras 130a, 130b, 130c, 130d, 130e, 130f, or a combination thereof. The monitoring system control unit 110 is configured to detect and process (i) sensor data generated by the one or more sensors 120a, 120b, 120c, 120d, 120e, 120f, 120g, 120h, 120i, (ii) images, videos, or the like captured and transmitted by the one or more cameras 130a, 130b, 130c, 130d, 130e, 130f, (iii) images, videos, or the like captured and transmitted by a drone-mounted camera 150a, (iv) sensor data generated by one or more drone-mounted sensors 150b, (v) messages generated and transmitted by the drone 150, or (vi) a combination thereof. In some implementations, the monitoring system control unit 110 may be configured to perform processing and analysis of the detected data to detect the potential existence of one or more events such as alarm events.

In some implementations, the monitoring system 100 may also include a network 180, a monitoring application server 190, and a central alarm station server 195. In some instances, the monitoring application server 190 may supplement, or replace, the functionality of the monitoring system control unit 110. For example, the monitoring system control unit 110 may detect and relay (i) sensor data generated by the one or more sensors 120a, 120b, 120c, 120d, 120e, 120f, 120g, 120h, 120i, (ii) images, videos, or the like captured and transmitted by the one or more cameras 130a, 130b, 130c, 130d, 130e, 130f, (iii) images, videos, or the like captured and transmitted by a drone-mounted camera 150a, (iv) sensor data generated by one or more drone-mounted sensors 150b, (v) messages generated and transmitted by the drone 150, or (vi) a combination thereof, to a cloud-based monitoring application server 190 using the networks 140, 180, and one or more communications links 182. In such implementations, the monitoring application server 190 may perform processing and analysis of the relayed data in an effort to detect the potential existence of one or more events such as alarm events. Accordingly, the monitoring system 100 may include a local "monitoring unit" in the form of a monitoring system control unit 110 or a remote "monitoring" unit in the form of a monitoring application server 190.

Alternatively, in some implementations, the monitoring application server 190 may be a cloud-based solution that can replace the local monitoring system control unit 110. For example, in this implementation (and other implementations) each sensor, camera, or the like may be equipped with a cellular communication device that can directly communicate generated (or captured) data to the monitoring application server via the one or more networks 140, 180, and one or more communication links 182. The monitoring application server 190 can then perform processing and analysis of the sensor, camera, and drone data that it receives in order to detect the potential existence of one or more events such as alarm events. Accordingly, in some implementations, the monitoring application server 190 may be configured to perform each of the operations described herein as being performed by the monitoring system control unit 110.

The monitoring system control unit 110 can be configured to detect that the drone 150 has departed a drone charging station 115 on a navigation path 105. For example, the monitoring system control unit 110 may (i) receive a notification from the drone 150, (ii) receive a notification from the drone charging station 115, or (iii) receive a notification from both, that is broadcast via the network 140 and individually, or collectively, indicate that the drone 150 has departed the drone charging station 115. The network 140 may include one or more of a LAN, a WAN, a cellular network, the Internet, or a combination thereof.

Typically, the monitoring system control unit 110, when in an armed state, may monitor sensor data generated by each of the one or more sensors 120a, 120b, 120c, 120d, 120e, 120f, 120g, 120h, 120i, 120j, camera feeds (e.g., video feeds, image feeds, etc) from one or more cameras 130a, 130b, 130c, 130d, 130e, 130f, or the like and determine whether the sensor data, camera data, or both, is indicative of a potential event such as an alarm event (e.g., movement that may be indicative of a trespasser on the premises, breaking of glass that may be indicative of a break-in by an intruder, or the like), an emergency event (e.g., fire, flood, gas leak or the like), or the like. However, the monitoring system control unit 110 of the present disclosure may perform different monitoring operations that depart from the typical monitoring activity described above based on the launch of a drone 150 from the drone charging station 115.

In response to detecting that the drone 150 has departed a drone charging station 115 the monitoring system control unit 110 may modify event detection processes employed by the monitoring system 100, the monitoring system control unit 110, the monitoring application server 190, or a combination thereof. In some implementations, the monitoring system control unit 110 may deactivate one or more sensors 120a, 120b, 120c, 120d, 120e, 120f, 120g, 120h, 120i, one or more cameras 130a, 130b, 130c, 130d, 130e, 130f, or the like in response to a drone 150 launch. Deactivating one or more sensors, one or more cameras, or the like may include the monitoring system control unit 110 transmitting instructions to the one or more sensors 120a, 120b, 120c, 120d, 120e, 120f, 120g, 120h, 120i, the one or more cameras 130a, 130b, 130c, 130d, 130e, 130f, or the like that configure the one or more sensors, the one or more cameras, or the like to not generate sensor data, camera data, or the like based on detection of an activity that typically causes the one or more sensors 120a, 120b, 120c, 120d, 120e, 120f, 120g, 120h, 120i, one or more cameras 130a, 130b, 130c, 130d, 130e, 130f, or the like to generate sensor data, camera data, or the like. Activities that typically cause the one or more sensors 120a, 120b, 120c, 120d, 120e, 120f, 120g, 120h, 120i, the one or more cameras 130a, 130b, 130c, 130d, 130e, 130f, or the like to generate sensor data, camera data, or the like may include activities such as movement within the property 101, glass-breaks within the property 101, a door of property 101 opening, a window of property 101 opening, loud noises within the property 101, or the like. Sensor data may include, for example, (i) data generated by a sensor 120a, 120b, 120c, 120d, 120e, 120f, 120g, 120h, 120i in response to movement, (ii) data generated by a sensor 120a, 120b, 120c, 120d, 120e, 120f, 120g, 120h, 120i in response to a glass-break, (iii) data generated by a sensor 120a, 120b, 120c, 120d, 120e, 120f, 120g, 120h, 120i in response to a window or door opening, (iv) data generated by a sensor 120a, 120b, 120c, 120d, 120e, 120f, 120g, 120h, 120i in response to a loud noise, (v) a combination thereof, or the like. Camera data may include images, videos, or the like captured by the one or more cameras 130a, 130b, 130c, 130d, 130e, 130f.

In some implementations, the monitoring system control unit 110 may strategically disable one or more sensors 120a, 120b, 120c, 120d, 120e, 120f, 120g, 120h, 120i, one or more cameras 130a, 130b, 130c, 130d, 130e, 130f, or the like. For example, in some implementations, the monitoring system control unit 110 may only disable one or more sensors 120a, 120b, 120c, 120d, 120e, 120f, 120g, 120h, 120i, one or more cameras 130a, 130b, 130c, 130d, 130e, 130f, or the like in a particular portion of the property 101 based on the presence of the drone 150 in proximity to one or more of the sensors 120a, 120b, 120c, 120d, 120e, 120f, 120g, 120h, 120i, one or more of the cameras 130a, 130b, 130c, 130d, 130e, 130f, or the like.

For example, in response to the launch of the drone 150, the monitoring system control unit 110 may determine that the motion sensing sensor 120e is in the flight path 105 of the drone 150, and then the monitoring system control unit 110 may transmit an instruction to a motion-sensing sensor 120e via the network 140 that instructs the sensor 120e to deactivate for a predetermined amount of time. In such instances, the motion sensing sensor 120e may be deactivated for a sufficient amount of time for the drone 150 to navigate past the motion sensing sensor 120e without the motion sensing sensor 120e generating sensor data that is indicative of movement based on the drone's 150 movement. Deactivating the motion sensing sensor 120e in this manner helps to reduce the likelihood that one or more sensors of the monitoring system 100 will trigger a false alarm.

Alternatively, or in addition, the monitoring system control unit 110 may modify event detection processes employed by the monitoring system 100 without deactivating one or more sensors 120a, 120b, 120c, 120d, 120e, 120f, 120g, 120h, 120i, one or more cameras 130a, 130b, 130c, 130d, 130e, 130f, or the like. Instead, the monitoring system control unit 110 may employ different processes in response to the detection of a drone 150 launch from the drone charging station 115. For example, the monitoring system control unit 110 may determine to disregard (e.g., ignore) sensor data generated by one or more sensors 120a, 120b, 120c, 120d, 120e, 120f, 120g, 120h, 120i, one or more cameras 130a, 130b, 130c, 130d, 130e, 130f, or the like based on (i) the detection of a drone 150 launch, (ii) a drone 150 flight path 105, (iii) drone location data received from the drone 150, (iv) a combination thereof, or (v) the like. In some implementations, sensor data generated by one or more sensors 120a, 120b, 120c, 120d, 120e, 120f, 120g, 120h, 120i, camera data generated by one or more cameras 130a, 130b, 130c, 130d, 130e, 130f, or the like that are within a predetermined distance of the drone 150 may be disregarded (e.g., ignored) by the monitoring system control unit 110 unless the sensor data generated by the one or more sensors 120a, 120b, 120c, 120d, 120e, 120f, 120g, 120h, 120i, the camera data generated by one or more cameras 130a, 130b, 130c, 130d, 130e, 130f, or the like is corroborated by one or more drone-mounted sensors.

The monitoring system control unit 110 may determine the one or more sensors 120a, 120b, 120c, 120d, 120e, 120f, 120g, 120h, 120i, the one or more cameras 130a, 130b, 130c, 130d, 130e, 130f, or the like that should be disabled, disregarded, or the like by comparing a current drone location or future drone location to (i) the location of one or more sensors 120a, 120b, 120c, 120d, 120e, 120f, 120g, 120h, 120i, (ii) the location of one or more cameras 130a, 130b, 130c, 130d, 130e, 130f, or (iii) a combination thereof that is stored in a monitoring system database. The current drone 150 location or future drone 150 location may be determined in a number of ways. For example, the current drone 150 location may be based on location information broadcast that is periodically broadcast by the drone 150. Alternatively, the current or future drone 150 location may be determined by the monitoring system control unit 110, the monitoring application server 190, or both, based on an evaluation of one or more of (i) drone 150 location information received from drone 150, (ii) a drone's 150 predetermined flight path 105, (iii) a drone 150 speed, (iv) a time of drone 150 launch, (v) a combination thereof, or (vi) the like.

By way of example, with reference to FIG. 1, the drone 150 follows a navigation path 105 that takes the drone 150 past at least the glass-break sensor 120b and the motion sensor 120a. The glass-break sensor 120b may be configured to generate sensor data that suggests that glass was broken in the vicinity of the sensor 120b in response to the detection of a sound pattern, frequency, pitch, or the like that is typically associated with glass shattering. The motion sensor 120a may be configured to generate sensor data in response to the detection of motion in the vicinity of the sensor 120a. The monitoring system control unit 110 may determine that sensor data generated by sensors 120b and 120a should be disregarded (e.g., ignored) because current drone 150 location broadcast by the drone via network 140 and detected by the monitoring system control unit 110 indicates that the drone 150 is in Room A. The monitoring system control unit 110 may modify the monitoring system control unit's 110 processing and analysis of detected sensor data to disregard (e.g., ignore) sensor data generated by sensors 120b and 120a. Alternatively, or in addition, the monitoring system control unit 110 may modify the monitoring system control unit's 110 processing and analysis of detected camera data to disregard (e.g., ignore) camera data generated by cameras 130a, 130b.

Continuing with the example of FIG. 1, the drone 150 navigates near the glass-break sensor 120b and the motion sensor 120a. The glass-break sensor 120b may generate sensor data 162 that is detected by the monitoring system control unit 110 via network 140. The generated sensor data 162 may be based on the sensor 120b detecting one or more high-pitched noise produced by the drone's 150 rotors, propulsion system, internal circuitry, or the like that may produce a sound pattern, frequency, pitch, or the like that is similar to glass shattering. Alternatively, or in addition, the motion sensor 120a may generate sensor data 164 that is detected by the monitoring system control unit 110 via network 140. The generated sensor data 164 may be based on the drone's 150 motion. In such instances, the monitoring system control unit's 110 modified processing and analysis of detected sensor data based on the drone's 150 presence in Room A is modified to disregard (e.g., ignore) the sensor data 162, 164. In some implementations, the monitoring system control unit 110 may disregard the sensor data 162, 164 while the drone 150 is present in Room A unless the sensor data 162, 164 is corroborated by one or more drone-mounted sensors 150b. The monitoring system control unit 110 may distinguish sensor data generated by one or more sensors 120a, 120b, 120c, 120d, 120e, 120f, 120g, 120h, 120i, camera data generated by one or more cameras 130a, 130b, 130c, 130d, 130e, 130f, or the like and sensor generated by one or more drone-mounted sensors 150b, camera data generated by one or more drone-mounted cameras 150a, or the like based on a sensor identifier that is included within the generated sensor data, camera data, or the like.

However, in the example of FIG. 1, the drone's 150 drone-mounted sensors 150b fail to detect the occurrence of a potential event such as a glass-break, motion inside the property 101, or the like. In such instances, the drone's 150 drone-mounted sensors 150b do not generate any sensor data that can be detected by the monitoring system control unit 110 to corroborate the sensor data 162, 164 from the glass-break sensor 620b and the motion sensor 620a, respectively. In response to the lack of additional corroborating sensor data from the drone 150, the monitoring system control unit 110 may disregard (e.g., ignore) the sensor data 162, 164 and avoid triggering a false alarm based on the sensor data 162, 164.

Alternatively, in other implementations, disregarding (e.g., ignoring) sensor data 162, 164 by the monitoring system control unit 110 may include delaying the triggering of an alarm based on the detection of sensor data 162, 164. In some implementations, the monitoring system control unit 110 may only employ a delay in triggering an alarm in response to sensor data 162, 164 if the monitoring system control unit 110 has received data, stored data, or a combination thereof, indicating that the drone 150 is present within a predetermined vicinity of the sensors 120b and 120a that generated the sensor data 162, 164. The delayed triggering of the alarm can allow a predetermined amount of time for feedback to be received from the drone 150. If the monitoring system control unit 110 does not receive feedback from the drone within the predetermined amount of time established by the delay, then the monitoring system control unit may trigger an alarm based on the sensor data 162, 164. In some implementations, the monitoring system control unit 110 may transmit a message to the drone 150 to request a status report of the portion of the property that includes sensors 120b and 120a that generated sensor data 162, 164.

The drone 150 may broadcast a message 172 that includes a status report related to the current threat level of associated with the portion of the property that includes sensors 120b and 120a. That message 172 may be broadcast in response to the request for a status report from the monitoring system control unit 110 or independently of a request for a status report from the monitoring system control unit 110. For example, the drone 150 may periodically transmit a status report at the expiration of a predetermined period of time (e.g., every 3 seconds, every 5 seconds, every 7 seconds, every 10 seconds, or the like). The status report may include, for example, a snapshot of sensor data generated by the drones 150 drone-mount sensors 150b, drone-mounted cameras 150a, or the like. Alternatively, the status report may include a binary value indicating that the portion of the property associated with the sensors 120b and 120a that generated sensor data 162, 164 is either safe (e.g., no sensor data generated that is indicative of a potential event) or not safe (e.g., sensor data is generated that is indicative of a potential event).

In this scenario, the drone 150 may generate and transmit a message 172 to the monitoring system control unit 110 indicating that the Room A is safe. The drone 150 may have determined that the Room A is safe because the drone-mounted sensors failed to generate sensor data that is indicative of a potential event. Accordingly, the monitoring system control unit 110 can disregard (e.g., ignore) sensor data 162, 164 and avoid triggering a false alarm based on sensor data 162, 164.

In a similar manner, the drone's presence in Room A may cause the monitoring system control unit 110 to deactivate the cameras 130a, 130b in Room A for at least a predetermined amount of time. When deactivated, the cameras 130a, 130b may not generate, capture, or the like any video, image, or audio data. The cameras 130a, 130b may be reactivated after the predetermined period of time expires. Alternatively, or in addition, the monitoring system control unit 110 may transmit a message to the cameras 130a, 130b to reactivate after the drone 150 leaves Room A.

In other implementations, the drone's presence in Room A may cause the monitoring system control unit 110 to disregard (e.g., ignore) camera data generated by the cameras 130a, 130b while the drone remains in Room A. In some implementations, camera data may still be captured by cameras 130a, 130b, but the monitoring system control unit 110, application monitoring server 190, or both, may determine not to store the captured camera data while the drone is present in Room A. The monitoring system control unit 110 may continue to disregard (e.g., ignore) the camera data captured by cameras 130a, 130b until (i) the drone 150 leaves Room A, or (ii) the drone-mounted sensor 150b data corroborates the existence of a potential event in Room A. The monitoring system control unit 110, the monitoring application server 190, or both may resume storing camera data from the cameras 130a, 130b in Room A after the drone 150 leaves Room A.

Figure 2:
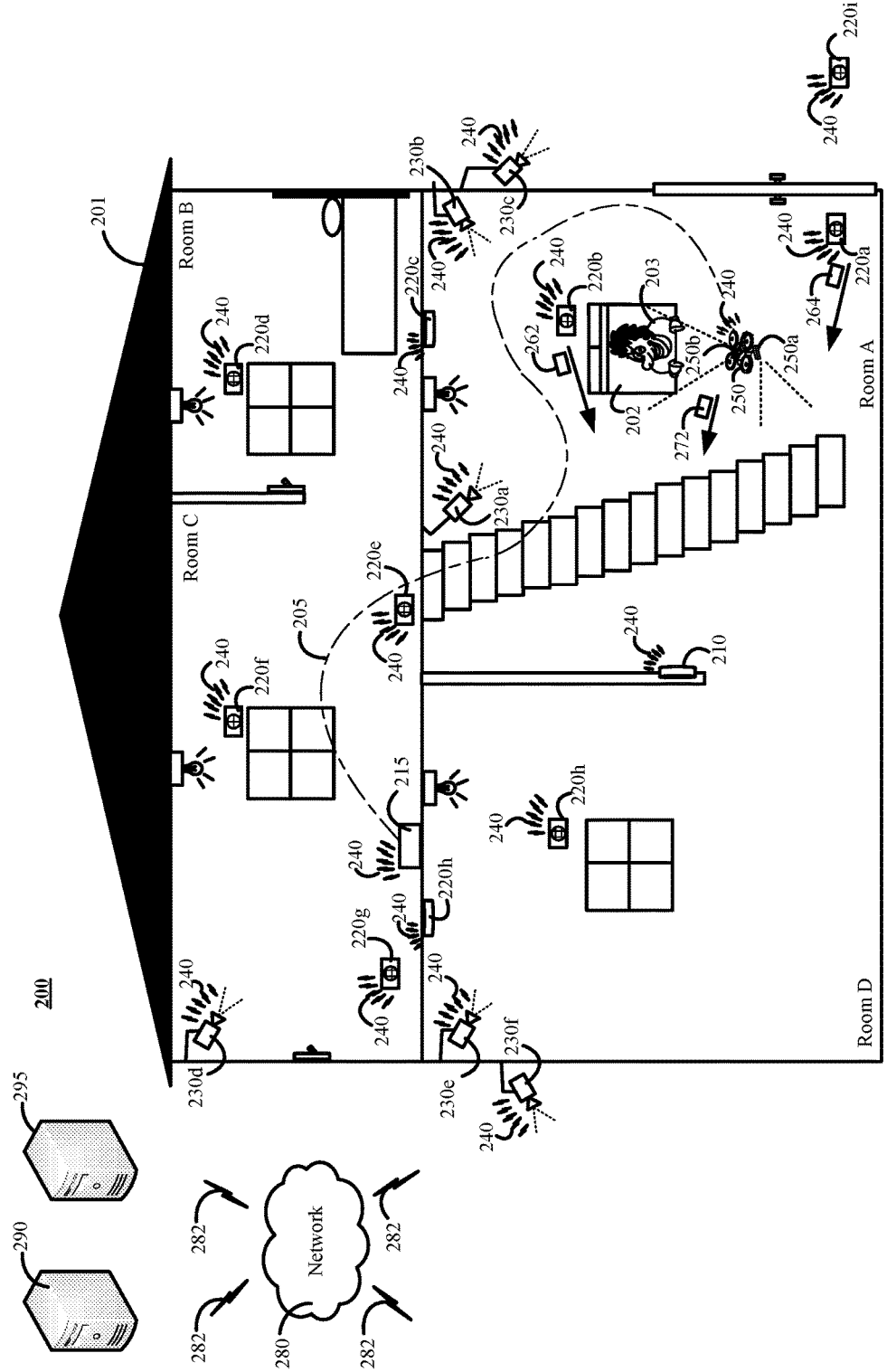
FIG. 2 is a contextual diagram of another example of a system for allowing drone activity to modify event detection by a monitoring system.

FIG. 2 is a contextual diagram of another example of a system for allowing drone 250 activity to modify event detection by a monitoring system 200.

The monitoring system 200 is the same monitoring system 200. However, the example of FIG. 2 highlights an example of the monitoring system 200 responding to a scenario where an intruder 203 is breaking into the property 201 via the window 202 when the drone 250 is present in Room A.

By way of example, with reference to FIG. 2, the drone 250 follows a navigation path 205 that takes the drone 250 past at least the glass-break sensor 220b and the motion sensor 220a. The monitoring system control unit 210 may determine based on a current drone location indicating that the drone 250 is located in Room A, that the sensor data generated by sensors 220b and 220a should be disregarded (e.g., ignored). Alternatively, or in addition, the monitoring system control unit 210 may determine to disregard (e.g., ignore) camera data generated by the cameras 130a, 130b. The monitoring system control unit 210 may modify the monitoring system control unit's 210 processing and analysis of detected sensor data and camera data to disregard (e.g., ignore) (i) sensor data generated by sensors 220b, 220a and (ii) camera data generated by cameras 130a, 130b. At the same time, the monitoring system control unit 210 may continue to monitor sensor data, camera data, or the like in other portions of the property where the drone 150 is not currently located.

In the example of FIG. 2, the intruder 203 may break the glass window 202 and begin to enter Room A as the drone 250 is navigating through Room A of the property 201. In response to the presence of the drone 250, the intruder breaking the glass and entering the property 201, or both, the glass-break sensor 220b generates sensor data 262 and the motion sensor 220a generates sensor data 264. In such instances, the monitoring system control unit 210 may initially disregard (e.g., ignore) the sensor data 262, 264 for at least a predetermined amount of time (i) based on the determination that a drone 250 has been launched, (ii) based on the current location of the drone 250, (iii) based on a potential future location of the drone 250, or (iv) a combination thereof, unless the sensor data 262, 264 is corroborated by the drone 250. The drone 250 may corroborate the sensor data 264 by generating sensor data that is indicative of a potential event. Alternatively, or in addition, the drone 250 may corroborate the sensor data 262, 264 by broadcasting a message that includes a status report of the Room A. The monitoring system control unit 210 may also disregard (e.g., ignore) camera data generated by cameras 130a, 130b.

With continuing reference to FIG. 2, for example, the drone-mounted sensors 250b can (i) detect the breaking of the glass window 202, (ii) detect movement by the intruder 203, or a (iii) combination thereof. In such instances, the drone's 250 drone-mounted sensors 250b may generate sensor data 272 that is detected by the monitoring system control unit 210. The drone generated sensor data 272 may be used by the monitoring system control unit 210 to corroborate the sensor data 262, 264 generated by the sensors 220b, 220a, respectively. In such instances, the monitoring system control unit 210 may determine based on (i) the received sensor data 262, 264 and (ii) the received drone generated sensor data 272 that a potential event is occurring at the property 101 in Room A. In such instances, the monitoring system control unit 210 may stop disregarding (e.g., ignoring) the sensor data 262, 264, stop disregarding (e.g., ignoring) the camera data generated by cameras 130a, 130b, and then trigger an alarm since the sensor data 262, 264 was corroborated by the drone 250.

Figure 3:
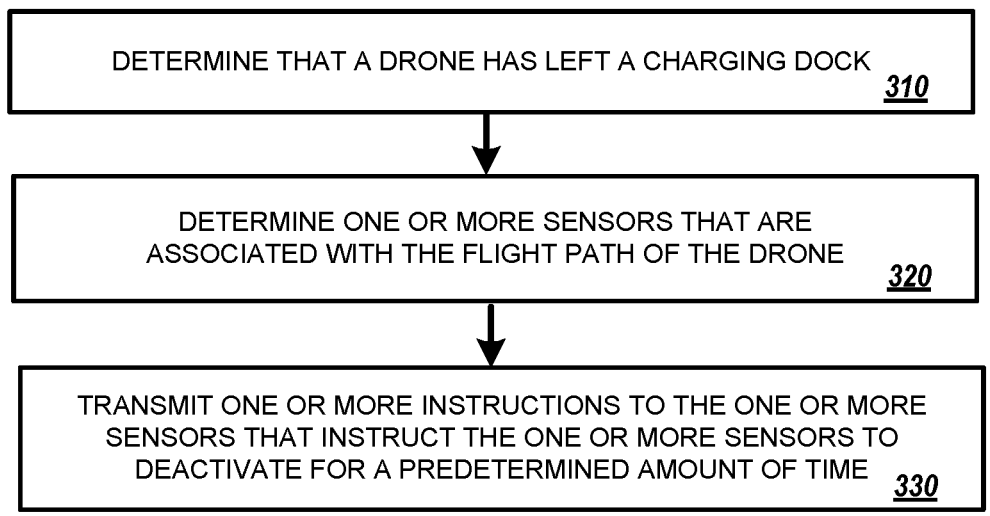
FIG. 3 is a flowchart of an example of a process for allowing drone activity to modify event detection by a monitoring system.

FIG. 3 is a flowchart of an example of a process 300 for allowing drone activity to modify event detection by a monitoring system. Generally, the process 300 may include determining that a drone has left a charging dock (310), determining one or more sensors that are associated with the flight path of the drone (320), and transmitting one or more instructions to the one or more sensors that instruct the one or more sensors to deactivate for a predetermined amount of time (330). For convenience, the process 300 is further described below as being performed by a monitoring system such as the monitoring system 100 or 200, as described with reference to FIGS. 1 and 2.

In more detail, the monitoring system determines 310 that a drone has left a charging dock. For example, the monitoring system may be configured to detect notifications indicating that the drone has launched from the charging dock. In some implementations, the drone may transmit a message to the monitoring system indicating that the drone has launched. Alternatively, or in addition, the charging dock may transmit a message to the monitoring system indicating that the drone has launched.

The monitoring system determines 320 one or more sensors that are associated with the flight path of the drone. The monitoring system may determine the one or more sensors that are associated with the flight path of the drone by accessing data describing the location of the one or more sensors stored in the monitoring system database. In some implementations, the drone may periodically broadcast the drone's current location as the drone navigates through a property monitored by the monitoring system. In such instances, the monitoring system may periodically receive updates regarding the drone's current location. Then, the drone can access a monitoring system database and compare the drone's current location to sensor locations stored in the monitoring system database in order to identify one or more sensors within a predetermined distance of the drone's current location. The comparison may yield one or more sensors that are within a predetermined distance of the drone's current location. The one or more sensors may include a motion sensor, a glass-break sensor, an audio sensor, a camera, or the like.

Alternatively, or in addition, the drone may be configured to navigate the property on a predetermined flight path. The predetermined flight path may be stored in the drone's memory, in the memory unit of the monitoring system, or both. The monitoring system may access the predetermined flight path, and determine one or more sensors that are associated with the drone's current location, one or more sensors that are associated with the drone's future location, or both. The monitoring system may be able to determine, based on (i) a timestamp associated with the drone's launch, (ii) the location of one or more sensors, and (iii) the drone's speed, the respective points-in-time in the future when a drone will encounter one or more particular sensors within the property when the drone navigates a predetermined flight path. In such instances, the monitoring system can generate a future time for each respective sensor of the one or more sensors that indicates the particular point-in-time when the drone will be in the vicinity of the respective sensor.

The monitoring system may transmit 330 one or more instructions to the one or more sensors that instruct the one or more sensors to deactivate for a predetermined amount of time. The instructions may be transmitted in response to a determination that the drone's current location is within a predetermined distance of a location of the one or more sensors. In some implementations, the instructions may be generated, transmitted, or a combination thereof, based on particular points-in-time that the monitoring system calculated in advance based on the drone's predetermined flight path.

Deactivating the one or more sensors may include instructing the one or more sensors to not generate sensor data based on the detection of an activity that typically causes the one or more sensors to generate sensors data. For example, a motion sensor may be deactivated by instructing the motion sensor to not generate sensor data in response to motion. This may include, for example, instructing the motion sensor to power down, enter a low power state, or the like. Powering down may include completely powering off the sensor. Entering a low power state may include turning off activity detection features of the sensor while leaving a receiving unit and processing unit powered on to receive instructions from a monitoring system to reactivate the sensor after the drone departs the vicinity of the sensor. The deactivation instruction may instruct the one or more sensors to deactivate for a predetermined period of time. The predetermined period of time may be determined based on (i) the drone's current location, (ii) the speed of the drone, (iii) the location of the one or more sensors, (iv) the drone's predetermined flight path, or (v) a combination thereof.

Figure 4:
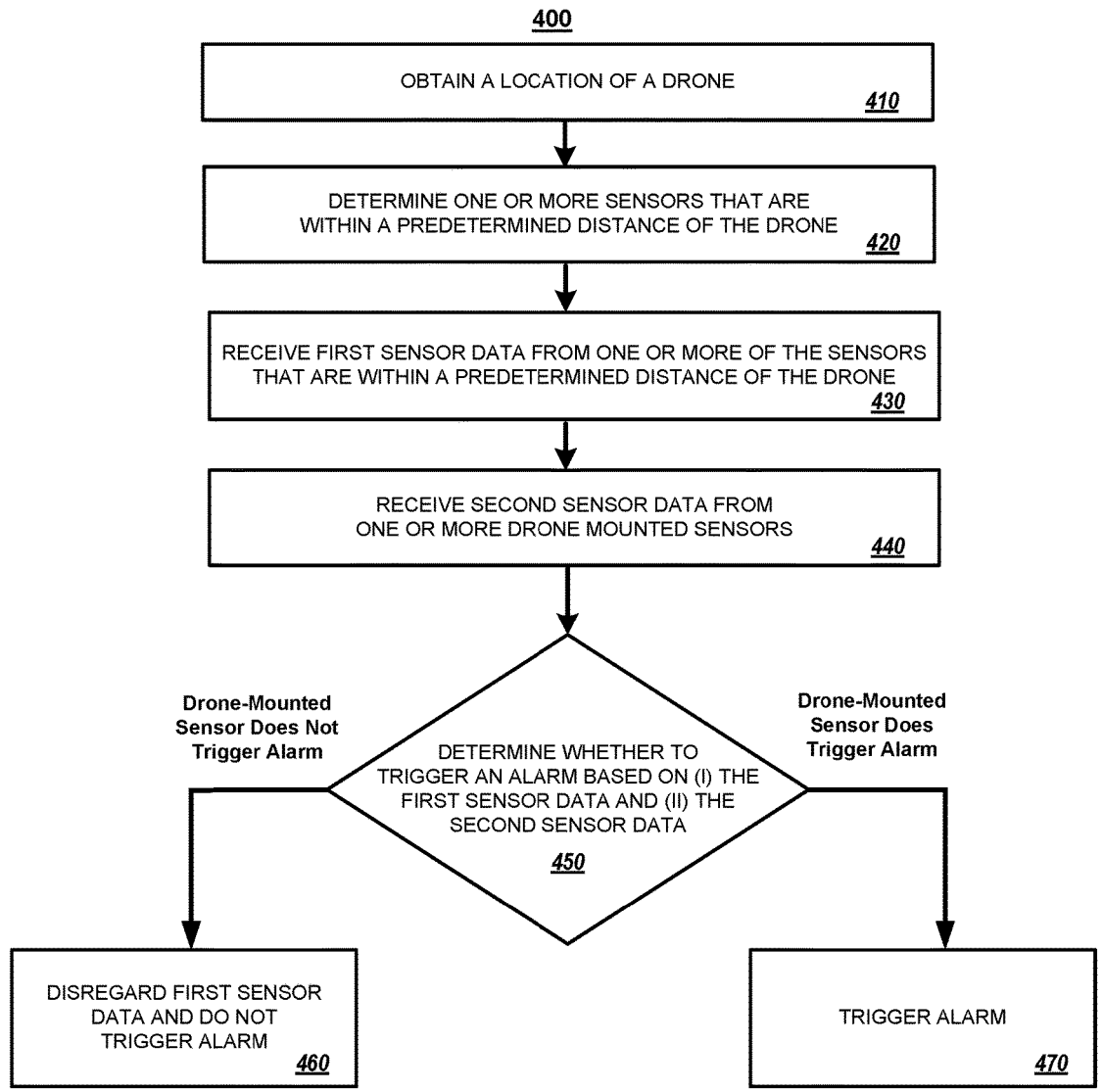
FIG. 4 is a flowchart of another example of a process for allowing drone activity to modify event detection by a monitoring system.

FIG. 4 is a flowchart of another example of a process 400 for allowing drone activity to modify event detection by a monitoring system. Generally, the process 400 may include obtaining a location of a drone (410), determining one or more sensors that are within a predetermined distance of the drone (420), detecting first sensor data from one or more of the sensors that are associated with the drone's location (430), detecting second sensor data from one or more drone-mounted sensors (440), and determining whether to trigger an alarm event based on (i) the first sensor data and (ii) the second sensor data (450). In response to determining that the drone-mounted sensor data does not trigger a potential event, disregarding first sensor data and do not trigger a potential alarm event (460). Alternatively, in response to determining that the drone-mounted sensor data does trigger a potential alarm event, triggering a potential alarm event (470). For convenience, the process 400 is further described below as being performed by a monitoring system such as the monitoring system 100 or 200, as described with reference to FIGS. 1 and 2.

The monitoring system obtains 410 the location of a drone. The monitoring system may obtain the location of the drone in a number of different ways. For example, the monitoring system may receive location information broadcast by the drone. The broadcast location information may be indicative of the drone's current location. Alternatively, the monitoring system may determine the current or future location of the drone based on the drone's predetermined flight path. For example, the monitoring system may receive a notification with a timestamp when the drone launches from a charging station. The monitoring system may access a storage location storing data describing the drone's predetermined navigation path. Then, based on the (i) drone's launch time, (ii) the drone's speed, (iii) the drone's predetermined flight path, or (iv) a combination thereof, the monitoring system can predict the drone's current location, one or more future locations for the drone, a combination thereof, or the like.

The monitoring system detects 430 first sensor data from one or more of the sensors that are associated with a drone's location. For example, the monitoring system may detect sensor data generated by one or more sensors located within a predetermined distance of the drone. A sensor may be within a predetermined distance of the drone if the sensor is within a predetermined number of inches, feet, yards, or the like of the drone. Alternatively, a sensor may be within a predetermined distance of the drone if the sensor is located in the same portion of the property (e.g., the same room) as the drone. The one or more sensors may include motion sensors, glass-break sensors, cameras, or the like.

The monitoring system detects 440 second sensor data from one or more drone-mounted sensors. The drone-mounted sensors may include one or more motion sensors, one or more glass-break sensors, one or more cameras, one or more microphones, or the like. The drone-mounted sensors may be configured to detect the presence of activity (e.g., motion, glass-breaks, footsteps, or the like) within a predetermined location of the one or more first sensors. In some implementations, the second sensor data may also include a status report that is generated by the drone. The status report may include sensor data generated by one or more drone-mounted sensors. Alternatively, the status report may include a binary value indicative of the current threat level of property such as a "0" indicating that a potential threat exists or a "1" indicating that a potential threat does not exist. In some implementations, the binary value indicative of the current threat level of the property may include more than one digit, character, or the like.

The monitoring system determines 450 whether to trigger an event based on (i) the first sensor data and (ii) the second sensor data. In some implementations, the monitoring system may use the second sensor data to corroborate the first sensor data. Determining whether to trigger the event based on the (i) first sensors data and (ii) the second sensor data may include, for example, the monitoring system delaying the triggering of an alarm based on the first sensor data until the monitoring system control until detects the second sensor data. In some implementations, if the monitoring system does not receive second sensor data within a predetermined time period, the monitoring system may trigger an alarm event based on the first sensor data alone.

In response to determining that the drone-mounted sensor data does not trigger an alarm, the monitoring system determines to disregard 450 the first sensor data and does not trigger a potential alarm. Alternatively, in response to determining that the drone-mounted sensor data does trigger an alarm, the monitoring system instructs the monitoring system to trigger 470 an alarm.

Figure 5:
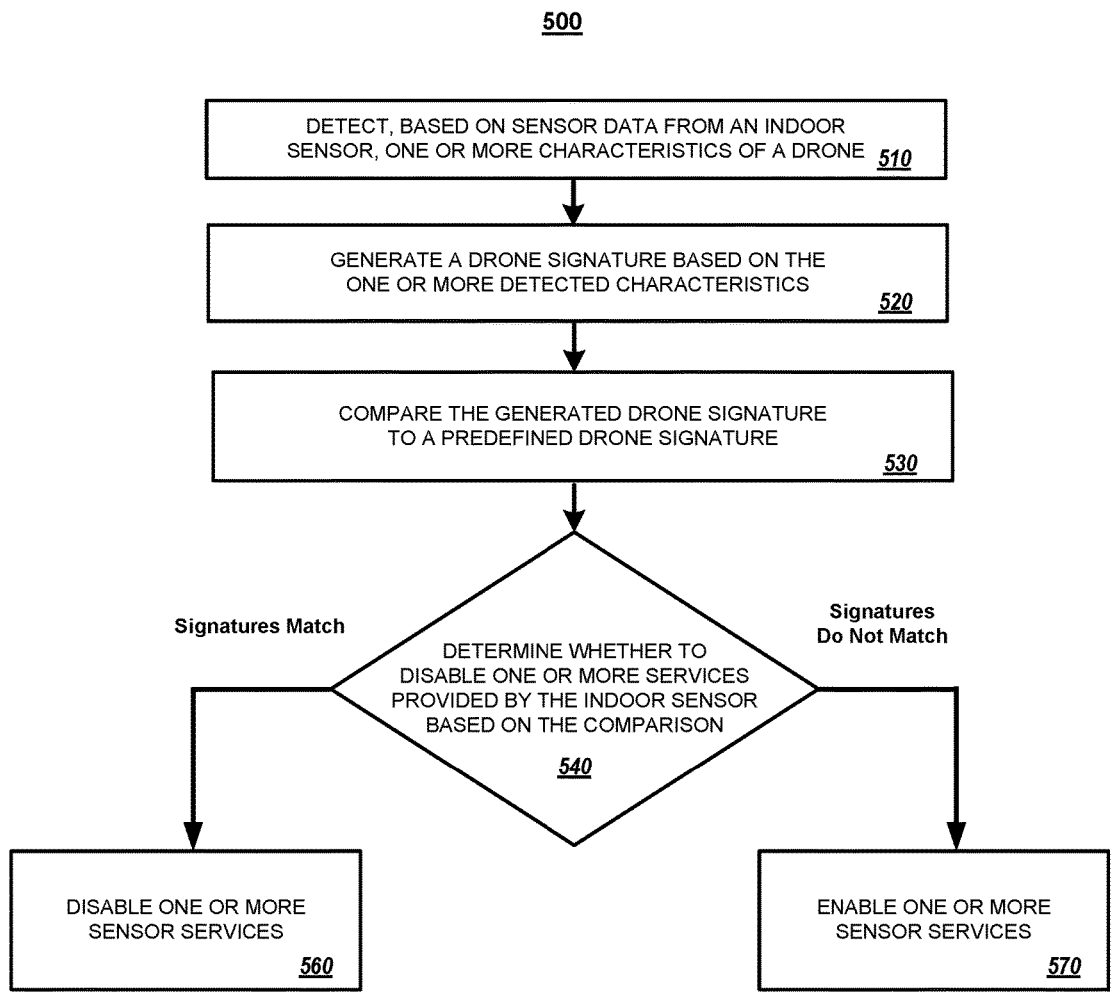
FIG. 5 is a flowchart of another example of a process for allowing drone activity to modify event detection by a monitoring system.

FIG. 5 is a flowchart of another example of a process 500 for allowing drone activity to modify event detection by a monitoring system. Generally, the process 500 includes detecting, based on sensor data from one or more indoor sensors, one or more characteristics of a drone (510), generating a drone signature based on the one or more characteristics (520), comparing the drone signature to a predefined drone signature (530), and determining whether to disable one or more services provided by the indoor sensor based on the comparison (540). In response to determining that the generated drone signature and the predefined drone signature match, disabling one or more services provided by the sensor (560). Alternatively, in response to determining that the generated drone signature and the predefined drone signature do not match, enabling one or more services provided by the sensor (570). For convenience, the process 500 is further described below as being performed by a monitoring system such as the monitoring system 100 or 200, as described with reference to FIGS. 1 and 2.

The monitoring system can detect 510, based on sensor data generated by one or more indoor sensors, one or more characteristics of a drone. Characteristics of the drone may include, for example, images of the profile of the drone, video of the profile of the drone, images of the number of propellers of the drone, video of the number of propellers of the drone, images of the area surrounding the drone, video of the area surrounding the drone, audio signals of the sound of the drone's propellers, audio signals of the sound of the drone's propulsion systems, radar detection of the speed of the drone, radiofrequency detection of the oscillation in electrical circuits of the drone, thermal signals generated from by the drone device, detection of RF communications to/from the drone, a combination thereof, or the like.

The monitoring system can generate 520 a drone signature based on the one or more characteristics of the drone that is detected inside the property. The drone signature may be based on a representation of the one or more drone characteristics detected at stage 510. In one implementation, a particular characteristic of the characteristics detected at stage 510 may be used to generate the drone signature. Alternatively, in other implementations, a collection of two or more of the characteristics obtained at stage 510 may be used to generate the drone signature. The drone signature can be used as a unique identifier that distinguishes the detected drone from other drone devices.

The monitoring system can compare 530 the generated drone signature to a predefined drone signature. Comparing the generated drone signature to a predefined drone signature may include, for example, using the generated drone signature to search a database one or more authorized drone signatures. The database of authorized drone signatures may include, for example, a drone signature of each drone that is authorized to navigate within the property. If the generated drone signature is determined to match a predefined drone signature within a predetermined amount of error, then the drone associated with the generated drone signature may be determined to be an authorized drone. Alternatively, if the generated drone signature is determined to not match a predefined drone signature within a predetermined amount of error, then the drone associated with the generated drone signature is determined to be an unauthorized drone.

The monitoring system may determine 540 whether to disable one or more services provided by the indoor sensor based on the comparison. In response to determining that the generated drone signature and the predefined drone signature match within a predetermined amount of error, the monitoring system may disable 560 one or more services provided by the sensor. In some implementations, for example, a camera may include one or more sensors that are capable of triggering the sensor service of (i) capturing one or more images, (ii) capturing video, (iii) capturing audio, (iv) a combination thereof, or the like. In such instances, the sensors can generate data that is used by the monitoring system to generate drone signature. And, if the generated drone signature matches a predefined and authorized drone signature, then the monitoring system can instruct the camera to (i) not capture images of the authorized drone, (ii) not capture video of the authorized drone, (iii) not capture audio of the authorized drone, (iv) a combination thereof, or the like.

Alternatively, in response to determining that the generated drone signature and the predefined drone signature do not match, the monitoring system may enable 570 one or more services provided by the one or more indoor sensors. For example, if the monitoring system determines that the generated drone signature fails to match a predefined and authorized drone signature, then the monitoring system can instruct the camera to (i) capture images of the authorized drone, (ii) capture video of the authorized drone, (iii) capture audio of the authorized drone, (iv) a combination thereof, or the like.

Use of the aforementioned process 500 may provide multiple advantages. For, example, the process 500 may help the monitoring system avoid triggering a false alarm in response to detecting presence, sound, movement, or the like from an authorized drone. Alternatively, the process 500 may help to optimize monitoring system resources. For example, not turning on the camera in response to the detection of an authorized drone may help to reduce to network bandwidth used to stream images, audio, video, or the like to a monitoring system storage location. Similarly, for example, not turning on the camera in response to the detection of an authorized drone may help to reduce the storage resources required to store images, audio, videos captured by the monitoring system.

Figure 6:
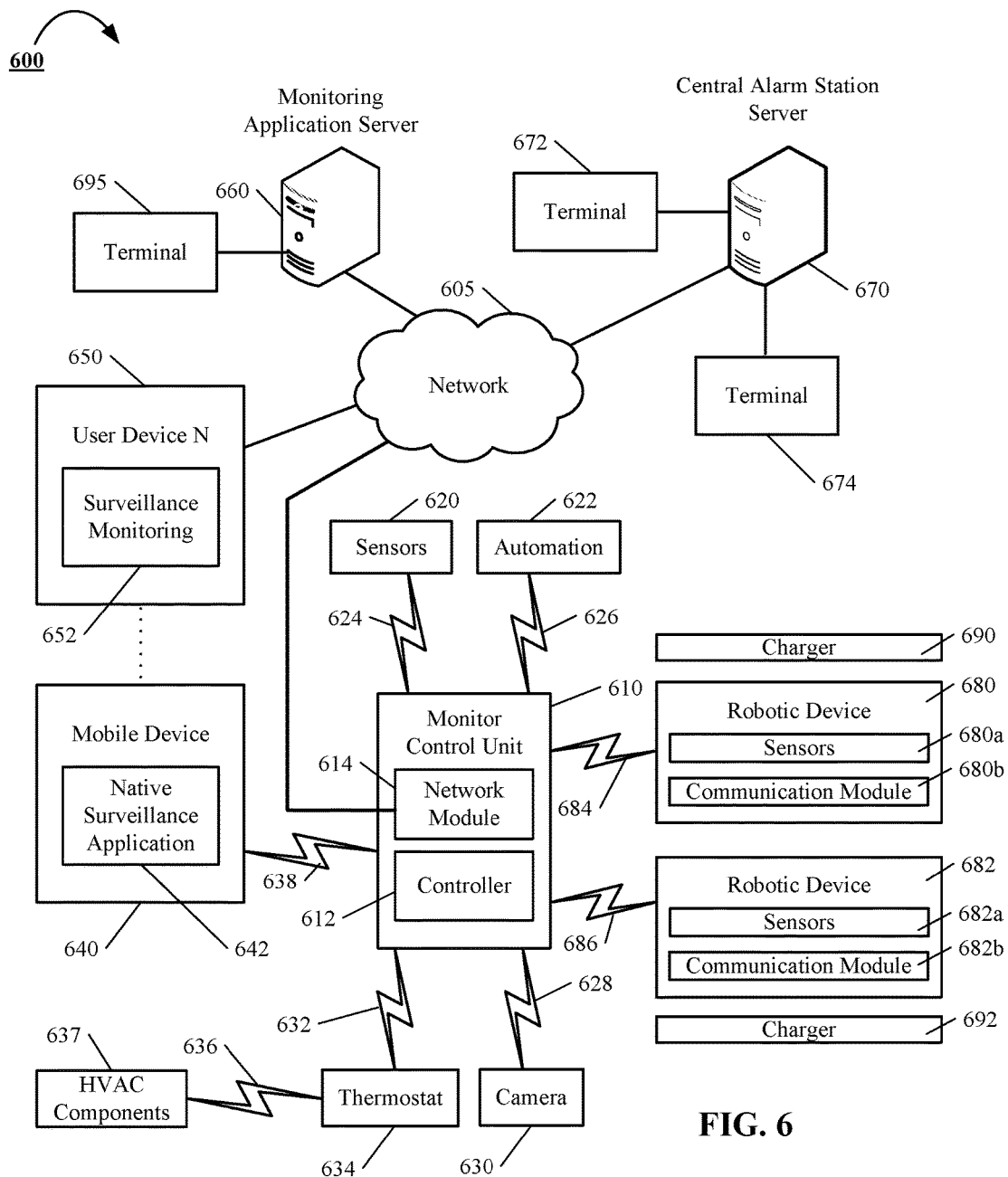
FIG. 6 is a block diagram of some example components that can be used to implement a system for allowing drone activity to modify event detection by a monitoring system.

FIG. 6 is a block diagram of some example components that can be used to implement a system for allowing drone activity to modify event detection by a monitoring system.

The electronic system 600 includes a network 605, a monitoring system control unit 610, one or more user devices 640, 650, a monitoring application server 660, and a central alarm station server 670. In some examples, the network 605 facilitates communications between the monitoring system control unit 610, the one or more user devices 640, 650, the monitoring application server 660, and the central alarm station server 670.

The network 605 is configured to enable exchange of electronic communications between devices connected to the network 605. For example, the network 605 may be configured to enable exchange of electronic communications between the monitoring system control unit 610, the one or more user devices 640, 650, the monitoring application server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The monitoring system control unit 610 includes a controller 612 and a network module 614. The controller 612 is configured to control a monitoring system (e.g., a home alarm or security system) that includes the monitoring system control unit 610. In some examples, the controller 612 may include a processor or other control circuitry configured to execute instructions of a program that controls operation of an alarm system. In these examples, the controller 612 may be configured to receive input from sensors, detectors, or other devices included in the alarm system and control operations of devices included in the alarm system or other household devices (e.g., a thermostat, an appliance, lights, etc.). For example, the controller 612 may be configured to control operation of the network module 614 included in the monitoring system control unit 610.

The monitoring system control unit 610 may be configured to detect sensor data from one or more sensors 620 is indicative of a potential alarm event. Alternatively, or in addition, the monitoring system control unit 610 may be configured to detect sensor data and relay the sensor data to the monitoring application server 660 for processing and analysis. In some implementations, one or more sensors 620 may communicate directly with the monitoring application server 660.

The monitoring system control unit 610, monitoring application server 660, or both, may be configured to disregard (e.g., ignore) sensor data generated by sensors 620, cameras 630, or the like. In some implementations, the monitoring system control unit 610 may disregard (e.g., ignore) sensor data generated by one or more sensors 620 if it is determined that a drone is located within a predetermined distance of the sensors 620. In such instance, the monitoring system control unit 610 may disregard (e.g., ignore) sensor data generated by one or more sensors 620 for at least a predetermined amount of time after it is determined that drone is within a predetermined distance of the sensors 620. In yet other implementations, the monitoring system control unit 610 can instruct a sensor 620 to deactivate, go into low-power shutdown mode, or the like in response to determining that robotic device 680 and 682 is within a predetermined distance of the sensors 620.

The monitoring system control unit 610, monitoring application server 660, or both, may disregard (e.g., ignore) sensor data, camera data, or both generated by sensors 620 and cameras 630 within a predetermined distance of robotic devices 680 and 682. The monitoring system control unit 610 may continue to disregard (e.g., ignore) the sensor data, camera data, or both until the drone moves more than a predetermined distance away from the sensors 620, the cameras 630, or both. Alternatively, or in addition, the monitoring system control unit 610 may continue to disregard (e.g., ignore) the sensor data, the camera data, or both until the drone-mounted sensors 680a, 682a generate sensor data that corroborates sensor data generated by the sensors 620.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the monitoring system control unit 610 to communicate over a local area network and/or the Internet. The network module 614 also may be a voiceband modem configured to enable the alarm panel to communicate over the telephone lines of Plain Old Telephone Systems (POTS).

The monitoring system that includes the monitoring system control unit 610 includes one or more sensors or detectors. For example, the monitoring system may include multiple sensors 620. The sensors 620 may include a contact sensor, a motion sensor, a glass break sensor, or any other type of sensor included in an alarm system or security system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 may include a radio-frequency identification (RFID) sensor that identifies a particular article that includes a pre-assigned RFID tag.

The monitoring system control unit 610 communicates with the module 622 and the camera 630 to perform surveillance or monitoring. The module 622 is connected to one or more devices that enable home automation control. For instance, the module 622 may be connected to one or more lighting systems and may be configured to control operation of the one or more lighting systems. Also, the module 622 may be connected to one or more electronic locks at the property and may be configured to control operation of the one or more electronic locks (e.g., control Z-Wave locks using wireless communications in the Z-Wave protocol. Further, the module 622 may be connected to one or more appliances at the property and may be configured to control operation of the one or more appliances. The module 622 may include multiple modules that are each specific to the type of device being controlled in an automated manner. The module 622 may control the one or more devices based on commands received from the monitoring system control unit 610. For instance, the module 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building monitored by the monitoring system control unit 610. The camera 630 may be configured to capture single, static images of the area and also video images of the area in which multiple images of the area are captured at a relatively high frequency (e.g., thirty images per second). The camera 630 may be controlled based on commands received from the monitoring system control unit 610.

The camera 630 may be triggered by several different types of techniques. For instance, a Passive Infra Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra Red, Z-wave controlled "white" lights, lights controlled by the module 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the monitoring control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 660 over the Internet. In these implementations, image data captured by the camera 630 does not pass through the monitoring system control unit 610 and the camera 630 receives commands related to operation from the monitoring application server 660.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the monitoring system control unit 610 and can control the environmental (e.g., temperature) settings based on commands received from the monitoring system control unit 610.

In some implementations, the thermostat 634 is a dynamically programmable thermostat and can be integrated with the monitoring system control unit 610. For example, the dynamically programmable thermostat 634 can include the monitoring system control unit 610, e.g., as an internal component to the dynamically programmable thermostat 634. In addition, the monitoring system control unit 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

The system 600 further includes one or more robotic devices 680 and 682. The robotic devices 680 and 682 may be any type of robots that are capable of moving and taking actions that assist in security monitoring. For example, the robotic devices 680 and 682 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 680 and 682 may be robotic devices that are intended for other purposes and merely associated with the monitoring system 600 for use in appropriate circumstances. For instance, a robotic vacuum cleaner device may be associated with the monitoring system 600 as one of the robotic devices 680 and 682 and may be controlled to take action responsive to monitoring system events.

In some examples, the robotic devices 680 and 682 automatically navigate within a property. In these examples, the robotic devices 680 and 682 include sensors and control processors that guide movement of the robotic devices 680 and 682 within the property. For instance, the robotic devices 680 and 682 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 680 and 682 may include control processors that process output from the various sensors and control the robotic devices 680 and 682 to move along a path that reaches the desired destination and avoids obstacles. In this regard, the control processors detect walls or other obstacles in the property and guide movement of the robotic devices 680 and 682 in a manner that avoids the walls and other obstacles.

In addition, the robotic devices 680 and 682 may store data that describes attributes of the property. For instance, the robotic devices 680 and 682 may store a floorplan and/or a three-dimensional model of the property that enables the robotic devices 680 and 682 to navigate the property. During initial configuration, the robotic devices 680 and 682 may receive the data describing attributes of the property, determine a frame of reference to the data (e.g., a home or reference location in the property), and navigate the property based on the frame of reference and the data describing attributes of the property. Further, initial configuration of the robotic devices 680 and 682 also may include learning of one or more navigation patterns in which a user provides input to control the robotic devices 680 and 682 to perform a specific navigation action (e.g., fly to an upstairs bedroom and spin around while capturing video and then return to a home charging base). In this regard, the robotic devices 680 and 682 may learn and store the navigation patterns such that the robotic devices 680 and 682 may automatically repeat the specific navigation actions upon a later request.

In some examples, the robotic devices 680 and 682 may include one or more drone-mounted sensors 680a and 682a that are configured to perform property monitoring, data capture, and recording of images, video, audio, and like. In these examples, the robotic devices 680 and 682 drone-mounted sensors 680a and 682a may include one or more cameras, one or more motion sensors, one or more glass-break sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 680 and 682 to take and store a biometric sample that can be used to identify the person (e.g., a biometric sample with DNA that can be used for DNA testing). In some implementations, sensor data related to the property can be generated, captured, collected, or otherwise obtained using the drone-mounted sensors 680a and 682a and used to corroborate sensor generated by one or more sensors 620.

In some implementations, the robotic devices 680 and 682 may include output devices. In these implementations, the robotic devices 680 and 682 may include one or more displays, one or more speakers, one or more projectors, and/or any type of output devices that allow the robotic devices 680 and 682 to communicate information to a nearby user. The one or more projectors may include projectors that project a two-dimensional image onto a surface (e.g., wall, floor, or ceiling) and/or holographic projectors that project three-dimensional holograms into a nearby space.

The robotic devices 680 and 682 also may include a communication module 680b and 682b that enables the robotic devices 680 and 682 to communicate with the monitoring system control unit 610, each other, and/or other devices. The communication module 680b and 682b may be a wireless communication module that allows the robotic devices 680 and 682 to communicate wirelessly. For instance, the communication module 680b and 682b may be a Wi-Fi module that enables the robotic devices 680 and 682 to communicate over a local wireless network at the property. The communication module 680b and 682b further may be a 900 MHz wireless communication module that enables the robotic devices 680 and 682 to communicate directly with the monitoring system control unit 610. Other types of short-range wireless communication protocols, such as Bluetooth, Bluetooth LE, Zwave, Zigbee, etc., may be used by the communication module 680b and 682b to allow the robotic devices 680 and 682 to communicate with other devices in the property. The robotic devices 680 and 682 can use the communication module 680b and 682b to broadcast sensor data generated by one or more drone-mounted sensors 680a and 682a via the network 605, one or more communications links 684 and 686, or a combination thereof that can be detected by the monitor control unit 610, the monitoring application server 660, or both.

The robotic devices 680 and 682 further may include processor and storage capabilities. The robotic devices 680 and 682 may include any suitable processing devices that enable the robotic devices 680 and 682 to operate applications and perform the actions described throughout this disclosure. In addition, the robotic devices 680 and 682 may include solid state electronic storage that enables the robotic devices 680 and 682 to store applications, configuration data, collected sensor data, and/or any other type of information available to the robotic devices 680 and 682.

The robotic devices 680 and 682 are associated with one or more charging stations 690 and 692. The charging stations 690 and 692 may be located at predefined home base or reference locations in the property. The robotic devices 680 and 682 may be configured to navigate to the charging stations 690 and 692 after completion of tasks needed to be performed for the monitoring system 600. For instance, after completion of a monitoring operation or upon instruction by the monitoring system control unit 610, the robotic devices 680 and 682 may be configured to automatically fly to and land on one of the charging stations 690 and 692. In this regard, the robotic devices 680 and 682 may automatically maintain a fully charged battery in a state in which the robotic devices 680 and 682 are ready for use by the monitoring system 600.

The charging stations 690 and 692 may be contact based charging stations and/or wireless charging stations. For contact based charging stations, the robotic devices 680 and 682 may have readily accessible points of contact that the robotic devices 680 and 682 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 680 and 682 may charge through a wireless exchange of power. In these cases, the robotic devices 680 and 682 need only locate themselves closely enough to the wireless charging stations for the wireless exchange of power to occur. In this regard, the positioning needed to land at a predefined home base or reference location in the property may be less precise than with a contact based charging station. Based on the robotic devices 680 and 682 landing at a wireless charging station, the wireless charging station outputs a wireless signal that the robotic devices 680 and 682 receive and convert to a power signal that charges a battery maintained on the robotic devices 680 and 682.

In some implementations, each of the robotic devices 680 and 682 has a corresponding and assigned charging station 690 and 692 such that the number of robotic devices 680 and 682 equals the number of charging stations 690 and 692. In these implementations, the robotic devices 680 and 682 always navigate to the specific charging station assigned to that robotic device. For instance, the robotic device 680 may always use changing station 690 and the robotic device 682 may always use changing station 692.

In some examples, the robotic devices 680 and 682 may share charging stations. For instance, the robotic devices 680 and 682 may use one or more community charging stations that are capable of charging multiple robotic devices 680 and 682. The community charging station may be configured to charge multiple robotic devices 680 and 682 in parallel. The community charging station may be configured to charge multiple robotic devices 680 and 682 in serial such that the multiple robotic devices 680 and 682 take turns charging and, when fully charged, return to a predefined home base or reference location in the property that is not associated with a charger. The number of community charging stations may be less than the number of robotic devices 680 and 682.

Also, the charging stations 690 and 692 may not be assigned to specific robotic devices 680 and 682 and may be capable of charging any of the robotic devices 680 and 682. In this regard, the robotic devices 680 and 682 may use any suitable, unoccupied charging station when not in use. For instance, when one of the robotic devices 680 and 682 has completed an operation or is in need of battery charge, the monitoring system control unit 610 references a stored table of the occupancy status of each charging station and instructs the robotic device to navigate to the nearest charging station that is unoccupied.

The sensors 620, the module 622, the camera 630, the thermostat 634, and the robotic devices 680 and 682 communicate with the controller 612 over communication links 624, 626, 628, 632, 684, and 686. The communication links 624, 626, 628, 632, 684, and 686 may be a wired or wireless data pathway configured to transmit signals from the sensors 620, the module 622, the camera 630, the thermostat 634, and the robotic devices 680 and 682 to the controller 612. The sensors 620, the module 622, the camera 630, the thermostat 634, and the robotic devices 680 and 682 may continuously transmit sensed values to the controller 612, periodically transmit sensed values to the controller 612, or transmit sensed values to the controller 612 in response to a change in a sensed value.

The communication links 624, 626, 628, 632, 684, and 686 may include a local network. The sensors 620, the module 622, the camera 630, the thermostat 634, and the robotic devices 680 and 682 and the controller 612 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 660 is an electronic device configured to provide monitoring services by exchanging electronic communications with the monitoring system control unit 610, the one or more user devices 640, 650, and the central alarm station server 670 over the network 605. For example, the monitoring application server 660 may be configured to monitor events (e.g., alarm events) generated by the monitoring system control unit 610. In this example, the monitoring application server 660 may exchange electronic communications with the network module 614 included in the monitoring system control unit 610 to receive information regarding events (e.g., alarm events) detected by the monitoring system control unit 610. The monitoring application server 660 also may receive information regarding events (e.g., alarm events) from the one or more user devices 640, 650.

In some examples, the monitoring application server 660 may route alarm data received from the network module 614 or the one or more user devices 640, 650 to the central alarm station server 670. For example, the monitoring application server 660 may transmit the alarm data to the central alarm station server 670 over the network 605.

The monitoring application server 660 may store sensor and image data received from the monitoring system and perform analysis of sensor and image data received from the monitoring system. Based on the analysis, the monitoring application server 660 may communicate with and control aspects of the monitoring system control unit 610 or the one or more user devices 640, 650.

The central alarm station server 670 is an electronic device configured to provide alarm monitoring service by exchanging communications with the monitoring system control unit 610, the one or more mobile devices 640, 650, and the monitoring application server 660 over the network 605. For example, the central alarm station server 670 may be configured to monitor alarm events generated by the monitoring system control unit 610. In this example, the central alarm station server 670 may exchange communications with the network module 614 included in the monitoring system control unit 610 to receive information regarding alarm events detected by the monitoring system control unit 610. The central alarm station server 670 also may receive information regarding alarm events from the one or more mobile devices 640, 650 and/or the monitoring application server 660.

The central alarm station server 670 is connected to multiple terminals 672 and 674. The terminals 672 and 674 may be used by operators to process alarm events. For example, the central alarm station server 670 may route alarm data to the terminals 672 and 674 to enable an operator to process the alarm data. The terminals 672 and 674 may include general-purpose computers (e.g., desktop personal computers, workstations, or laptop computers) that are configured to receive alarm data from a server in the central alarm station server 670 and render a display of information based on the alarm data. For instance, the controller 612 may control the network module 614 to transmit, to the central alarm station server 670, alarm data indicating that a sensor 620 detected a door opening when the monitoring system was armed. The central alarm station server 670 may receive the alarm data and route the alarm data to the terminal 672 for processing by an operator associated with the terminal 672. The terminal 672 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640, 650 are devices that host and display user interfaces. For instance, the user device 640 is a mobile device that hosts one or more native applications (e.g., the native surveillance application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a native surveillance application 642. The native surveillance application 642 refers to a software/firmware program running on the corresponding mobile device that enables the user interface and features described throughout. The user device 640 may load or install the native surveillance application 642 based on data received over a network or data received from local media. The native surveillance application 642 runs on mobile devices platforms, such as iPhone, iPod touch, Blackberry, Google Android, Windows Mobile, etc. The native surveillance application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 660 and/or the monitoring system control unit 610 over the network 605. The user device 650 may be configured to display a surveillance monitoring user interface 652 that is generated by the user device 650 or generated by the monitoring application server 660. For example, the user device 650 may be configured to display a user interface (e.g., a web page) provided by the monitoring application server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640, 650 communicate with and receive monitoring system data from the monitoring system control unit 610 using the communication link 638. For instance, the one or more user devices 640, 650 may communicate with the monitoring system control unit 610 using various local wireless protocols such as wifi, Bluetooth, zwave, zigbee, HomePlug (ethernet over powerline), or wired protocols such as Ethernet and USB, to connect the one or more user devices 640, 650 to local security and automation equipment. The one or more user devices 640, 650 may connect locally to the monitoring system and its sensors and other devices. The local connection may improve the speed of status and control communications because communicating through the network 605 with a remote server (e.g., the monitoring application server 660) may be significantly slower.

Although the one or more user devices 640, 650 are shown as communicating with the monitoring system control unit 610, the one or more user devices 640, 650 may communicate directly with the sensors and other devices controlled by the monitoring system control unit 610. In some implementations, the one or more user devices 640, 650 replace the monitoring system control unit 610 and perform the functions of the monitoring system control unit 610 for local monitoring and long range/offsite communication.

In other implementations, the one or more user devices 640, 650 receive monitoring system data captured by the monitoring system control unit 610 through the network 605. The one or more user devices 640, 650 may receive the data from the monitoring system control unit 610 through the network 605 or the monitoring application server 660 may relay data received from the monitoring system control unit 610 to the one or more user devices 640, 650 through the network 605. In this regard, the monitoring application server 660 may facilitate communication between the one or more user devices 640, 650 and the monitoring system.

In some implementations, the one or more user devices 640, 650 may be configured to switch whether the one or more user devices 640, 650 communicate with the monitoring system control unit 610 directly (e.g., through link 638) or through the monitoring application server 660 (e.g., through network 605) based on a location of the one or more user devices 640, 650. For instance, when the one or more user devices 640, 650 are located close to the monitoring system control unit 610 and in range to communicate directly with the monitoring system control unit 610, the one or more user devices 640, 650 use direct communication. When the one or more user devices 640, 650 are located far from the monitoring system control unit 610 and not in range to communicate directly with the monitoring system control unit 610, the one or more user devices 640, 650 use communication through the monitoring application server 660.

Although the one or more user devices 640, 650 are shown as being connected to the network 605, in some implementations, the one or more user devices 640, 650 are not connected to the network 605. In these implementations, the one or more user devices 640, 650 communicate directly with one or more of the monitoring system components and no network (e.g., Internet) connection or reliance on remote servers is needed.

In some implementations, the one or more user devices 640, 650 are used in conjunction with only local sensors and/or local devices in a house. In these implementations, the system 600 only includes the one or more user devices 640, 650, the sensors 620, the module 622, the camera 630, and the robotic devices 680 and 682. The one or more user devices 640, 650 receive data directly from the sensors 620, the module 622, the camera 630, and the robotic devices 680 and 682 and sends data directly to the sensors 620, the module 622, the camera 630, and the robotic devices 680 and 682. The one or more user devices 640, 650 provide the appropriate interfaces/processing to provide visual surveillance and reporting.

In other implementations, the system 600 further includes network 605 and the sensors 620, the module 622, the camera 630, the thermostat 634, and the robotic devices 680 and 682 are configured to communicate sensor and image data to the one or more user devices 640, 650 over network 605 (e.g., the Internet, cellular network, etc.). In yet another implementation, the sensors 620, the module 622, the camera 630, the thermostat 634, and the robotic devices 680 and 682 (or a component, such as a bridge/router) are intelligent enough to change the communication pathway from a direct local pathway when the one or more user devices 640, 650 are in close physical proximity to the sensors 620, the module 622, the camera 630, the thermostat 634, and the robotic devices 680 and 682 to a pathway over network 605 when the one or more user devices 640, 650 are farther from the sensors 620, the module 622, the camera 630, the thermostat 634, and the robotic devices 680 and 682. In some examples, the system leverages GPS information from the one or more user devices 640, 650 to determine whether the one or more user devices 640, 650 are close enough to the sensors 620, the module 622, the camera 630, the thermostat 634, and the robotic devices 680 and 682 to use the direct local pathway or whether the one or more user devices 640, 650 are far enough from the sensors 620, the module 622, the camera 630, the thermostat 634, and the robotic devices 680 and 682 that the pathway over network 605 is required. In other examples, the system leverages status communications (e.g., pinging) between the one or more user devices 640, 650 and the sensors 620, the module 622, the camera 630, the thermostat 634, and the robotic devices 680 and 682 to determine whether communication using the direct local pathway is possible. If communication using the direct local pathway is possible, the one or more user devices 640, 650 communicate with the sensors 620, the module 622, the camera 630, the thermostat 634, and the robotic devices 680 and 682 using the direct local pathway. If communication using the direct local pathway is not possible, the one or more user devices 640, 650 communicate with the sensors 620, the module 622, the camera 630, the thermostat 634, and the robotic devices 680 and 682 using the pathway over network 605.

In some implementations, the system 600 provides end users with access to images captured by the camera 630 to aid in decision making. The system 600 may transmit the images captured by the camera 630 over a wireless WAN network to the user devices 640, 650. Because transmission over a wireless WAN network may be relatively expensive, the system 600 uses several techniques to reduce costs while providing access to significant levels of useful visual information.

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "Away" state, but set not to capture images when the alarm system is armed in a "Stay" state or disarmed. In addition, the camera 630 may be triggered to begin capturing images when the alarm system detects an event, such as an alarm event, a door opening event for a door that leads to an area within a field of view of the camera 630, or motion in the area within the field of view of the camera 630. In other implementations, the camera 630 may capture images continuously, but the captured images may be stored or transmitted over a network when needed.

Further, in some implementations, the system 600 intelligently leverages the robotic devices 680 and 682 to aid in security monitoring, property automation, and property management. For example, the robotic devices 680 and 682 may aid in investigating alarm events detected at the property by the monitoring system control unit 610. In this example, the monitoring system control unit 610 may detect an alarm event (e.g., a fire alarm, an entry into the property when the system is armed "Stay," etc.) and, based on the detected alarm event, control the robotic devices 680 and 682 to attempt to identify persons in the property at the time of the alarm event. Specifically, the monitoring system control unit 610 may send a control command to each of the robotic devices 680 and 682 that causes the robotic devices 680 and 682 to perform a coordinated and automated search for persons in the property. Based on the control command received, each of the robotic devices 680 and 682 begins navigating the property and captures images of the property while navigating. Each of the robotic devices 680 and 682 may execute a predefined navigation pattern within the property or the robotic devices 680 and 682 may execute a coordinated scan of the property in which the robotic devices 680 and 682 exchange location information and navigate to areas that have not been explored by one of the other devices.

In some examples, the robotic devices 680 and 682 may analyze the images captured during the scan of the property for the presence of persons in the captured images. For instance, the robotic devices 680 and 682 may use image processing techniques in an attempt to identify shapes in the captured images that resemble a human body. The robotic devices 680 and 682 also may analyze the images for moving objects (or use other techniques to identify moving objects) and target imaging on capture of moving objects.

Based on detection of a human or a moving object, the robotic devices 680 and 682 may lock onto the human or moving object and follow the human or moving object throughout the property. In this regard, the robotic devices 680 and 682 may follow the human or moving object throughout the property and capture images of the movement. In addition, once one of the robotic devices 680 and 682 locks onto a human or moving object, the robotic devices 680 and 682 coordinate to ensure that multiple of the robotic devices 680 and 682 do not lock onto the same human or moving object. The coordination may be direct amongst the robotic devices 680 and 682 and/or through the monitoring system control unit 610. The coordination may involve sharing the location of the human or moving object and/or attributes of the human or moving object being imaged. Based on the shared location and attributes, the robotic devices 680 and 682 may determine whether multiple robotic devices 680 and 682 have locked onto the same object and take action accordingly. If the robotic devices 680 and 682 determine that the robotic devices 680 and 682 have not locked onto the same object, the appropriate one of the robotic devices 680 and 682 continues to lock onto the object while the other robotic devices scan other areas of the property for other objects. If the robotic devices 680 and 682 determine that the robotic devices 680 and 682 have locked onto the same object, the robotic devices 680 and 682 negotiate to determine which of the robotic devices 680 and 682 will continue to lock onto the object while the other robotic devices stop locking onto the object and scan other areas of the property for other objects. The negotiation may select the robotic device that continues tracking the object based on one or more factors including the timing of when the devices locked onto the object (e.g., which device locked onto the object first), the positioning of the devices relative to the object (e.g., which is best positioned to image the object), the amount of battery power remaining (e.g., the device with the most battery power remaining), or any other factor that indicates the device most suited to track the object. To the extent the device tracking an object becomes less suitable for tracking the object (e.g., the battery power is running low), the robotic devices 680 and 682 may coordinate to hand off tracking of the object to another one of the robotic devices 680 and 682.

In some examples, the robotic devices 680 and 682 perform image recognition processing on the one or more images in an attempt to detect whether any identified humans are legitimate users of the property or intruders. In these examples, the robotic devices 680 and 682 may have access to images of legitimate users of the property and may compare images being captured to the accessed images of legitimate users. Based on the comparison, the robotic devices 680 and 682 use facial recognition techniques to determine whether the imaged user matches a legitimate user of the property or an intruder. The robotic devices 680 and 682 then use the determination of whether the imaged user matches a legitimate user of the property or an intruder to control further tracking operation.

For example, based on a determination that the imaged user is an intruder, the robotic devices 680 and 682 may continue tracking the intruder and ensure that images sufficient to identify the intruder have been captured. In this example, the robotic devices 680 and 682 may attempt to capture biometric data from the intruder, such as voiceprint data, fingerprint data, and/or biological samples with DNA of the intruder. In addition, the robotic devices 680 and 682 may take action to thwart the purpose of the intruder. For example, the robotic devices 680 and 682 may fly in random patterns around the intruder, may play loud sounds near the intruder, may shine lights near the intruder, may output identifying information collected about the intruder (e.g., male, around six feet tall and one hundred eighty pounds), may enable a central station operator or first responder to talk to the intruder through a two-way voice communication session established through the monitoring system control unit 610 and the robotic device, and may take other actions directed to disrupting the intruder.

Alternatively, based on a determination that the imaged user is a legitimate user, the robotic devices 680 and 682 may discontinue tracking the legitimate user and scan for intruders. The robotic devices 680 and 682 also may report the location of the legitimate user. The robotic devices 680 and 682 further may continue tracking the legitimate user and attempt to provide assistance to the user. For instance, if the alarm is a fire alarm event, the robotic devices 680 and 682 may stay near the legitimate user, continuously or periodically update the location of the legitimate user to assist another user or first responder in helping the legitimate user, provide audible reminders of what types of actions should be taken in a fire, enable a central station operator or first responder to talk to the legitimate user through a two-way voice communication session established through the monitoring system control unit 610 and the robotic device, and may take other actions directed to assisting the legitimate user.

In some examples, the robotic devices 680 and 682 may be assigned to different areas of the property where the robotic devices 680 and 682 can move in an unobstructed manner. In these examples, the robotic devices 680 and 682 may be assigned to different levels in a property (e.g., an upstairs robotic device and a downstairs robotic device) and even different rooms or sections that are potentially blocked by doors. The monitoring system control unit 610 coordinate tracking movement based on the assigned areas. For instance, the monitoring system control unit 610 determines areas in a property where an event has been detected (e.g., where motion is sensed, where a door or window is opened, etc.) and only controls the robotic devices assigned to the determined areas to operate. In this regard, the monitoring system control unit 610 may use location of users determined using sensors to control operation of the robotic devices 680 and 682.

In addition, the robotic devices 680 and 682 may be assigned as interior and exterior devices. The interior devices may navigate throughout an interior of the property. The exterior devices may navigate about an exterior periphery of the property. The exterior devices may be weather conditioned to remain outdoors (e.g., in an outdoor enclosure) at all times such that the exterior devices can explore an exterior of the property at any suitable time. In addition, the exterior devices may remain inside the property and the monitoring system control unit 610 may open a door to enable an exterior robotic device to leave and return to the property. For instance, an exterior device may have a base or reference location in a garage of the property and the monitoring system control unit 610 may automatically open a garage door to allow the exterior device to leave the garage and explore the exterior of the property.

In some implementations, the monitoring system control unit 610 may monitor operational status of the robotic devices 680 and 682 and coordinate further operation based on the operational status. In these implementations, the monitoring system control unit 610 may detect that a particular robotic device is no longer operational and control one or more other robotic devices to perform operations originally assigned to the non-operational robotic device. In addition, the monitoring system control unit 610 may determine that the non-operational robotic device was navigating close to an intruder and received an impact based on accelerometer data prior to becoming non-operational. In this case, the monitoring system control unit 610 may infer that the robotic device was smashed by the intruder and control other robotic devices based on the inference. For instance, after inferring a smash event, the monitoring system control unit 610 may control operation of other robotic devices to maintain distance from the intruder by only flying high overhead.

In some implementations, the monitoring system control unit 610 may determine battery power available for each of the robotic devices 680 and 682 and coordinate operation of the robotic devices 680 and 682 based on available battery power. In these implementations, the robotic devices 680 and 682 may report battery power remaining to the monitoring system control unit 610 and the monitoring system control unit 610 may determine a subset of the robotic devices 680 and 682 to deploy based on the battery power information. For instance, the monitoring system control unit 610 may select to initially deploy the robotic device with the most available battery power to allow the other robotic devices to charge while the selected device assists with monitoring. Once the battery power for the selected device falls below a threshold, the monitoring system control unit 610 may return the selected device to a charging station and select the robotic device with the presently highest available battery power to resume the monitoring options being performed. The monitoring system control unit 610 may cycle through all of the robotic devices 680 and 682 in an intelligent manner that best leverages the battery power available. If the battery power of a device becomes too low to effectively operate as a navigating device, the monitoring system control unit 610 may control the robotic device to remain stationary and act as a stationary camera or other sensor to still assist with monitoring, although the added benefit of navigation no longer exists.

In addition to battery, the monitoring system control unit 610 may select the robotic device to deploy and what action to take based on the sensor that triggered the event, a time of day, and a state of the system. For instance, if the monitoring system control unit 610 detects an unusual motion sensor event, the monitoring system control unit 610 may select the nearest robotic device to navigate to an area of the property where motion was detected and investigate. Alternatively, if the monitoring system control unit 610 detects a critical alarm event (e.g., a security breach of a system armed stay, a fire alarm, a carbon monoxide alarm, etc.), the monitoring system control unit 610 may deploy all robotic devices 680 and 682 at any time of the day. If the monitoring system control unit 610 detects an intrusion breach, the monitoring system control unit 610 may assign some devices to "attack" the intruder by disrupting the purpose of the intruder and collecting identifying information for the intruder and assign some devices to search for other users in the property. The selected devices and actions taken may vary based on sensor data, time of day, and the state of the monitoring system.

In some implementations, the system 600 allows central station operators, first responders, and/or users of the property to interact with and control the robotic devices 680 and 682. In these implementations, a central station operator, first responder, or user of the property may provide input to control the robotic devices 680 and 682 in a manner that best assists with monitoring and investigation of detected events. For instance, the central station operator, first responder, or user of the property may remotely control navigation of the robotic devices 680 and 682. The central station operator, first responder, or user of the property also may provide general commands related to actions the robotic devices 680 and 682 are designed to take. In response to these general commands, the robotic devices 680 and 682 may automatically perform the desired actions, such as following an instruction to explore the property or following an instruction to navigate to an upstairs bedroom.

In some examples, the robotic devices 680 and 682 may periodically perform test sequences to ensure the robotic devices 680 and 682 will operate correctly if needed. In these examples, the robotic devices 680 and 682 may periodically navigate predefined navigation patterns used to investigate the property and/or may navigate around the property in a scanning sequence. The robotic devices 680 and 682 may determine whether the test sequences perform correctly or whether an error occurs that prevents full investigation of the property. To the extent an error occurs, the robotic devices 680 and 682 report the error and enable a user of the property or a technician to correct the error prior to a time when the robotic devices 680 and 682 would be needed for safety monitoring.

The monitoring system control unit 610 also may arrange the test sequences to occur during periods of time that are convenient for users of the property. For example, the monitoring system control unit 610 may assess sensor data at the property and determine a time period in which the property is unoccupied and unlikely to be occupied until the test sequences complete. In this example, the monitoring system control unit 610 waits until the preferred time period to initiate test sequences for one or more of the robotic devices 680 and 682.

In some examples, the robotic devices 680 and 682 may be used to provide a critical alert to a user in the property or attempt to wake a sleeping person as appropriate. In these examples, none of the users may be responding to a critical alert and, in response, the monitoring system control unit 610 may control the robotic devices 680 and 682 to search for a person in the property and provide the critical alert very close to an identified person in a manner that is highly likely to gain the person's attention to the critical alert. In the event that the person appears to be sleeping in the property, the robotic devices 680 and 682 may attempt to wake the person by providing loud input very near the person and/or by making contact with the person. In this regard, the robotic devices 680 and 682 may be useful in waking a sleeping person when a fire or carbon monoxide alarm has been detected and the person needs to leave the property. The robotic devices 680 and 682 also may determine when a person is nonresponsive (e.g., unconscious) and may be need of immediate assistance. Also, the robotic devices 680 and 682 may serve as an alarm clock for critical meetings based on a person having trouble waking up using traditional alarm clocks.

In some implementations, the robotic devices 680 and 682 may operate as mobile sensors that move throughout the property. In these implementations, the robotic devices 680 and 682 may have temperature sensors that can be used as inputs to a thermostat at the property. In this regard, the robotic devices 680 and 682 may navigate throughout the property and take temperature measurements at various locations in the property. With the temperatures at various locations, the system 600 may identify hot and/or cold spots in the property and adjust thermostat operation accordingly. For instance, the robotic devices 680 and 682 may be deployed to take temperature measurements in areas of the property where people are located and the thermostat may be adjusted to improve the temperature in the location where people are actually located in the property.

In some examples, the robotic devices 680 and 682 may have humidity and air flow sensors in addition to temperature sensors. In these examples, the robotic devices 680 and 682 may periodically navigate throughout the property and take temperature, humidity, and air flow measurements at various locations throughout the property. The system 600 may use the temperature, humidity, and air flow measurements to detect inefficient areas of the property. The inefficiencies may be used to detect areas where insulation in the property in deficient (e.g., new siding, windows, and/or doors may be useful in certain areas) and/or where leaks exist in the property. The property efficiency information may be provided to a user of the property to enable the user to improve efficiency in the property.

The invention claimed is:

1. A property monitoring system for enabling drone activity in a property monitored by the property monitoring system without triggering a false alarm, the property monitoring system comprising:
a monitoring unit that includes:
one or more processors, and
one or more non-transitory computer readable storage media storing instructions that, when executed by the one or more processors, performs operations that include:
obtaining, by the monitoring unit, a location of the drone;
identifying, by the monitoring unit, a first sensor installed at the property that is within a predetermined distance of the drone;
detecting, by the monitoring unit, first sensor data generated by the first sensor that is within a predetermined distance of the drone, wherein the first sensor data includes data that is indicative of an event; determining, by the monitoring unit, whether a second sensor that is mounted to the drone is generating second sensor data that corroborates the event indicated by the first sensor data; and
in response to a determination that the second sensor that is mounted to the drone has not generated second sensor data that corroborates the event indicated by the first sensor data, disregarding, by the monitoring unit, the first sensor data in determining whether to trigger an alarm.

2. The property monitoring system of claim 1, the operations further comprising:
in response to a determination that the second sensor that is mounted to the drone has generated second sensor data that corroborates the event indicated by the first sensor data, determining, by the monitoring unit, to trigger an alarm based on the event indicated by the first sensor data and the second sensor data.

3. The property monitoring system of claim 2, the operations further comprising:
triggering, by the monitoring unit, an alarm based on the determination by the monitoring unit that the second sensor data corroborates the event indicated by the first sensor data.

4. The property monitoring system of claim 1, the operations further comprising:
identifying, by the monitoring unit, a third sensor installed at the property that is not within a predetermined distance of the drone;
detecting, by the monitoring unit, third sensor data generated by the third sensor that is not within a predetermined distance of the drone, wherein the third sensor data includes data that is indicative of an event; and
determining, by the monitoring unit, to trigger an alarm based on the event indicated by the third sensor data.

5. The property monitoring system of claim 1, wherein obtaining, by the monitoring unit, the location of the drone comprises:
obtaining location information that is broadcast by a communication device that is mounted to the drone.

6. The property monitoring system of claim 1, wherein identifying, by the monitoring unit, a first sensor installed at the property that is within a predetermined distance of the drone comprises:
identifying a first sensor installed at the property that is located within a same room as the drone, and
wherein the first sensor that is installed at the property includes a motion detector, a glass break sensor, a camera, or a microphone.

7. The property monitoring system of claim 1, wherein the second sensor that is mounted to the drone includes a motion sensor.

8. The property monitoring system of claim 2,
wherein detecting, by the monitoring unit, first sensor data generated by the first sensor that is within a predetermined distance of the drone comprises:
detecting, by the monitoring unit, first sensor data generated by a first motion sensor that is within a predetermined distance of the drone, wherein the first sensor data that is generated by the first motion sensor includes data indicative of a moving object; and
wherein determining, by the monitoring unit, whether a second sensor that is mounted to the drone is generating second sensor data that corroborates the event indicated by the first sensor data comprises:
determining, by the monitoring unit, whether a second motion sensor that is mounted to the drone has generated data indicative of a moving object that corroborates the detection of a moving object by the first motion sensor.

9. The property monitoring system of claim 2,
wherein detecting, by the monitoring unit, first sensor data generated by the first sensor that is within a predetermined distance of the drone comprises:
detecting, by the monitoring unit, first sensor data generated by a first motion sensor that is within a predetermined distance of the drone, wherein the first sensor data that is generated by the first motion sensor includes data indicative of a moving object; and
wherein determining, by the monitoring unit, whether a second sensor that is mounted to the drone is generating second sensor data that corroborates the event indicated by the first sensor data comprises:
determining, by the monitoring unit, whether a camera that is mounted to the drone has captured image data that depicts an image of a human object that is present in the property and corroborates the detection of a moving object by the first motion sensor.

10. The property monitoring system of claim 2,
wherein detecting, by the monitoring unit, first sensor data generated by the first sensor that is within a predetermined distance of the drone comprises:
detecting, by the monitoring unit, first sensor data generated by a first motion sensor that is within a predetermined distance of the drone, wherein the first sensor data that is generated by the first motion sensor includes data indicative of the presence of a human object; and
wherein determining, by the monitoring unit, whether a second sensor that is mounted to the drone is generating second sensor data that corroborates the event indicated by the first sensor data comprises:
determining, by the monitoring unit, whether a microphone that is mounted to the drone has captured sound data that corroborates the detection of the presence of the human object by the first motion sensor.

11. The property monitoring system of claim 10, wherein the sound data that corroborates the detection of the presence of the human object by the first motion sensor includes a sound of a voice, a sound of footsteps, or a sound of breathing.

12. The property monitoring system of claim 2,
wherein detecting, by the monitoring unit, first sensor data generated by the first sensor that is within a predetermined distance of the drone comprises:
  detecting, by the monitoring unit, first sensor data generated by a first glass break sensor that is within a predetermined distance of the drone, wherein the first sensor data that is generated by the first glass break sensor includes data indicative of a high pitched sound associated with the breaking of glass; and
wherein determining, by the monitoring unit, whether a second sensor that is mounted to the drone is generating second sensor data that corroborates the event indicated by the first sensor data comprises:
  determining, by the monitoring unit, whether a second glass-break sensor that is mounted to the drone has generated data indicative of a high pitched sound that corroborates the detection of breaking glass by the first glass break sensor.

13. The property monitoring system of claim 1, wherein the monitoring unit is located at a location that is remote from the property.

14. A method for enabling drone activity in a property monitored by a property monitoring system without triggering a false alarm, the method comprising:
  obtaining, by the property monitoring system, a location of the drone;
  identifying, by the property monitoring system, a first sensor installed at the property that is within a predetermined distance of the drone;
  detecting, by the property monitoring system, first sensor data generated by the first sensor that is within a predetermined distance of the drone, wherein the first sensor data includes data that is indicative of an event;
  determining, by the property monitoring system, whether a second sensor that is mounted to the drone is generating second sensor data that corroborates the event indicated by the first sensor data; and
  in response to a determination that the second sensor that is mounted to the drone has not generated second sensor data that corroborates the event indicated by the first sensor data, disregarding, by the property monitoring system, the first sensor data in determining whether to trigger an alarm.

15. The method of claim 14, the method further comprising:
  in response to a determination that the second sensor that is mounted to the drone has generated second sensor data that corroborates the event indicated by the first sensor data, determining, by the property monitoring system, to trigger an alarm based on the event indicated by the first sensor data and the second sensor data.

16. The method of claim 14, the method further comprising:
  identifying, by the property monitoring system, a third sensor installed at the property that is not within a predetermined distance of the drone;
  detecting, by the property monitoring system, third sensor data generated by the third sensor that is not within a predetermined distance of the drone, wherein the third sensor data includes data that is indicative of an event; and
  determining, by the property monitoring system, to trigger an alarm based on the event indicated by the third sensor data.

17. The method of claim 15,
wherein detecting, by the property monitoring system, first sensor data generated by the first sensor that is within a predetermined distance of the drone comprises:
  detecting, by the property monitoring system, first sensor data generated by a first motion sensor that is within a predetermined distance of the drone, wherein the first sensor data that is generated by the first motion sensor includes data indicative of a moving object; and
wherein determining, by the property monitoring system, whether a second sensor that is mounted to the drone is generating second sensor data that corroborates the event indicated by the first sensor data comprises:
  determining, by the property monitoring system, whether a second motion sensor that is mounted to the drone has generated data indicative of a moving object that corroborates the detection of a moving object by the first motion sensor.

18. The method of claim 15,
wherein detecting, by the property monitoring system, first sensor data generated by the first sensor that is within a predetermined distance of the drone comprises:
  detecting, by the property monitoring system, first sensor data generated by a first motion sensor that is within a predetermined distance of the drone, wherein the first sensor data that is generated by the first motion sensor includes data indicative of a moving object; and
wherein determining, by the property monitoring system, whether a second sensor that is mounted to the drone is generating second sensor data that corroborates the event indicated by the first sensor data comprises:
  determining, by the property monitoring system, whether a camera that is mounted to the drone has captured image data that depicts an image of a human object that is present in the property and corroborates the detection of a moving object by the first motion sensor.

19. The method of claim 15,
wherein detecting, by the property monitoring system, first sensor data generated by the first sensor that is within a predetermined distance of the drone comprises:
  detecting, by the property monitoring system, first sensor data generated by a first motion sensor that is within a predetermined distance of the drone, wherein the first sensor data that is generated by the first motion sensor includes data indicative of a moving object; and
wherein determining, by the property monitoring system, whether a second sensor that is mounted to the drone is generating second sensor data that corroborates the event indicated by the first sensor data comprises:
  determining, by the property monitoring system, whether a microphone that is mounted to the drone has captured sound data that is indicative of a moving object in the property and corroborates the detection of a moving object by the first motion sensor.

20. The method of claim 15,
wherein detecting, by the property monitoring system, first sensor data generated by the first sensor that is within a predetermined distance of the drone comprises:
- detecting, by the property monitoring system, first sensor data generated by a first glass break sensor that is within a predetermined distance of the drone, wherein the first sensor data that is generated by the first glass break sensor includes data indicative of a high pitched sound associated with the breaking of glass; and wherein determining, by the property monitoring system, whether a second sensor that is mounted to the drone is generating second sensor data that corroborates the event indicated by the first sensor data comprises:
determining, by the property monitoring system, whether a second glass-break sensor that is mounted to the drone has generated data indicative of a high pitched sound that corroborates the detection of breaking glass by the first glass break sensor.

\* \* \* \* \*